US012593833B2

(12) United States Patent
Oros

(10) Patent No.: US 12,593,833 B2
(45) Date of Patent: Apr. 7, 2026

(54) HAND-HELD RODENT TRAP SETTING DEVICES WITH TRAP RETAINER

(71) Applicant: Vasile Oros, Menlo Park, CA (US)

(72) Inventor: Vasile Oros, Menlo Park, CA (US)

( * ) Notice: Subject to any disclaimer, the term of this patent is extended or adjusted under 35 U.S.C. 154(b) by 0 days.

(21) Appl. No.: 19/069,650

(22) Filed: Mar. 4, 2025

(65) Prior Publication Data

US 2026/0033481 A1     Feb. 5, 2026

Related U.S. Application Data

(63) Continuation-in-part of application No. 18/900,791, filed on Sep. 29, 2024, which is a continuation-in-part of application No. 18/793,813, filed on Aug. 4, 2024.

(51) Int. Cl.
*A01M 23/28*       (2006.01)
*A01M 23/24*       (2006.01)
*A01M 23/30*       (2006.01)

(52) U.S. Cl.
CPC .......... *A01M 23/245* (2013.01); *A01M 23/30* (2013.01)

(58) Field of Classification Search
CPC ...... A01M 23/28; A01M 23/30; A01M 23/24; A01M 23/245
USPC ................. 43/97, 96, 81, 81.5, 82, 83, 83.5; 269/16, 53, 54
See application file for complete search history.

(56) References Cited

U.S. PATENT DOCUMENTS 744,379 A * 11/1903 Mast ..................... A01M 23/30
                                              43/81
839,511 A * 12/1906 Worthington ............. B25B 5/06
                                              269/154
(Continued)

FOREIGN PATENT DOCUMENTS

| CN | 207355334 U | * | 5/2018 | |
| DE | 551560 C | * | 6/1932 | |
| GB | 2512625 A | * | 10/2014 | ........... A01M 23/30 |
| WO | WO-8200568 A1 | * | 3/1982 | ........... A01M 23/30 |
| WO | WO-9700607 A1 | * | 1/1997 | ........... A01M 23/24 |
| WO | WO-2019156575 A1 | * | 8/2019 | ........... A01M 23/24 |

(Continued)

OTHER PUBLICATIONS

Essentra, "Everything you need to know about toggle clamps," https://www.essentracomponents.com/en-us/news/solutions/access-hardware/everything-you-need-to-know-about-toggle-clamps, Jun. 23, 2023.

(Continued)

*Primary Examiner* — Darren W Ark
(74) *Attorney, Agent, or Firm* — Law Office of Andrei D Popovici, PC

(57)          ABSTRACT
A hand-held rodent trap setting device includes a base supporting a rodent trap, a handle, and a releasable trap retainer that user-releasably secures the rodent trap to the platform. The device allows a user to arm the trap near a delivery location, and place the trap even in relatively inaccessible locations. The retainer may include a clamping arm that presses down on the top surface of the trap base, a spring-loaded ball that presses up on the underside of the trap base, and/or a magnet that attaches to a metallic part of the rodent trap such as the arm bar hinge. A trap release such as a clamping arm actuator, a longitudinal plunger, and/or a slidable magnet support allows detaching the rodent trap after arming. A spring-loaded safety catch allows automatically securing the kill bar of the trap when the trap is being armed while secured to the platform.

10 Claims, 26 Drawing Sheets

(56) References Cited

U.S. PATENT DOCUMENTS

| | | | | |
|---|---|---|---|---|
| 903,296 | A * | 11/1908 | Lawler | A01M 23/30 43/83.5 |
| 1,014,550 | A * | 1/1912 | Winkler | A01M 23/30 43/81 |
| 1,015,916 | A * | 1/1912 | Teel | A01M 23/30 43/97 |
| 1,067,526 | A * | 7/1913 | Larison | A01M 23/30 43/81 |
| 1,184,558 | A * | 5/1916 | Morton | A01M 23/30 43/81 |
| 1,194,954 | A * | 8/1916 | Casey | A01M 23/30 43/81 |
| 1,416,737 | A * | 5/1922 | Munroe | A01M 23/30 43/97 |
| 1,429,011 | A * | 9/1922 | Anderson | A01M 23/30 43/81 |
| 1,441,523 | A * | 1/1923 | Pittman | A01M 23/30 43/97 |
| 1,446,715 | A * | 2/1923 | Mertz | A01M 23/30 43/83 |
| 1,472,217 | A * | 10/1923 | Gufler | A01M 23/30 43/97 |
| 1,472,666 | A * | 10/1923 | Munroe | A01M 23/30 43/97 |
| 1,477,446 | A * | 12/1923 | Reisiger | A01M 23/30 43/97 |
| 1,491,829 | A * | 4/1924 | Stoeffler | A01M 23/30 43/81 |
| 1,541,855 | A * | 6/1925 | Sands | A01M 23/30 43/83.5 |
| 1,599,433 | A * | 9/1926 | Pickell | A47B 19/10 269/154 |
| 1,671,258 | A * | 5/1928 | Seghers | A01M 23/30 43/81.5 |
| 1,726,127 | A * | 8/1929 | Seghers | A01M 23/30 43/97 |
| 1,830,261 | A * | 11/1931 | Bunker | A01M 23/30 43/81 |
| 1,897,151 | A * | 2/1933 | Seghers | A01M 23/30 43/97 |
| 1,967,179 | A * | 7/1934 | Schocke | A01M 23/30 43/81 |
| 1,975,048 | A * | 9/1934 | Ludeke | A01M 23/30 43/97 |
| 1,995,344 | A * | 3/1935 | Gebhard | A01M 23/30 43/81 |
| 1,997,932 | A * | 4/1935 | Houts | A01M 23/30 43/92 |
| 2,059,119 | A * | 10/1936 | Korbisser | A01M 23/30 43/83.5 |
| D112,969 | S * | 1/1939 | Uttz, Sr. | 43/81 |
| 2,160,717 | A * | 5/1939 | Booth | A01M 23/30 43/81 |
| 2,169,783 | A * | 8/1939 | Allen | A01M 23/00 43/75 |
| 2,199,167 | A * | 4/1940 | Brooks | A01M 23/24 43/75 |
| 2,263,560 | A * | 11/1941 | Barrows | A01M 23/30 43/83.5 |
| 2,311,178 | A * | 2/1943 | Jorgensen | A01M 23/30 43/81.5 |
| 2,511,519 | A * | 6/1950 | Van Brunt | A01M 23/30 43/83 |
| 2,525,533 | A * | 10/1950 | Dunkelberger | A01M 23/30 43/83.5 |
| 2,602,260 | A * | 7/1952 | Marsden | A01M 23/30 43/81.5 |
| 2,604,722 | A * | 7/1952 | Petersen | A01M 23/30 43/83.5 |
| 2,702,443 | A * | 2/1955 | Bruske | A01M 23/30 43/81 |
| 2,955,820 | A * | 10/1960 | Berg | B25B 11/00 269/221 |
| 3,392,478 | A * | 7/1968 | Strayline | A01M 23/30 43/81.5 |
| 4,088,312 | A * | 5/1978 | Frosch | B25B 11/005 269/21 |
| 4,200,272 | A * | 4/1980 | Godding | B25B 1/2421 269/26 |
| 4,607,450 | A * | 8/1986 | Kaiser | A01M 23/30 43/83 |
| 4,703,583 | A * | 11/1987 | Dzurkovich | A01M 23/30 43/79 |
| 4,793,603 | A * | 12/1988 | Wober | B25B 5/04 269/254 R |
| 4,825,579 | A * | 5/1989 | Dzurkovich | A01M 23/30 43/82 |
| 5,050,337 | A * | 9/1991 | Moore | A01M 23/30 43/97 |
| 5,120,033 | A * | 6/1992 | Shoda | B23Q 1/035 269/21 |
| 5,148,624 | A * | 9/1992 | Schmidt | A01M 23/30 43/81 |
| 5,172,512 | A * | 12/1992 | Bodker | A01M 23/30 43/81 |
| 5,960,583 | A * | 10/1999 | Hansson | A01M 23/28 43/81 |
| 5,984,293 | A * | 11/1999 | Abrahamson | B23Q 1/035 269/53 |
| 6,119,391 | A * | 9/2000 | Maconga | A01M 23/30 43/81 |
| 6,199,314 | B1 * | 3/2001 | Ballard | A01M 23/30 43/81 |
| 6,264,187 | B1 * | 7/2001 | Hertz | B25B 1/2421 269/21 |
| 6,315,878 | B1 * | 11/2001 | Patadia | H01L 21/68735 269/53 |
| 6,726,195 | B1 * | 4/2004 | Hertz | B23Q 1/035 269/309 |
| 7,311,302 | B1 * | 12/2007 | Farlow | H05K 13/0069 269/21 |
| 7,997,891 | B2 * | 8/2011 | Gallagher | B29C 33/302 264/553 |
| 8,104,222 | B2 * | 1/2012 | Hovey | A01M 23/30 43/81 |
| 8,770,567 | B2 * | 7/2014 | Piggott | B23B 39/06 269/310 |
| 9,282,733 | B2 * | 3/2016 | Love | A01M 23/245 |
| 10,440,944 | B2 * | 10/2019 | LaRoque | A01M 31/002 |
| 12,213,473 | B2 * | 2/2025 | Jones | A01M 23/245 |
| 2006/0064922 | A1 * | 3/2006 | Crispens | A01M 23/245 43/81 |
| 2008/0000145 | A1 * | 1/2008 | Weinberger | A01M 23/30 43/81 |
| 2010/0018105 | A1 * | 1/2010 | Gauker | A01M 23/30 43/61 |
| 2019/0150425 | A1 * | 5/2019 | LaRoque | A01M 23/245 |
| 2019/0350186 | A1 * | 11/2019 | Drake | A01M 23/245 |
| 2020/0390082 | A1 * | 12/2020 | Waiker | A01M 23/245 |
| 2021/0022333 | A1 * | 1/2021 | Vickery | A01M 31/002 |
| 2022/0225605 | A1 * | 7/2022 | LaRoque | A01M 23/245 |
| 2025/0122635 | A1 * | 4/2025 | Oros | C25B 15/02 |

FOREIGN PATENT DOCUMENTS

| | | | | |
|---|---|---|---|---|
| WO | WO-2022180052 | A1 * | 9/2022 | A01M 23/30 |
| WO | WO-2023282772 | A1 * | 1/2023 | A01M 23/18 |

OTHER PUBLICATIONS

Azur Tech, "How to Make a Powerful Mousetrap Gun (rattrap gun)," screenshots from video available at https://www.youtube.com/watch?v=OAM_tEfFFME, Jan. 2015.

* cited by examiner

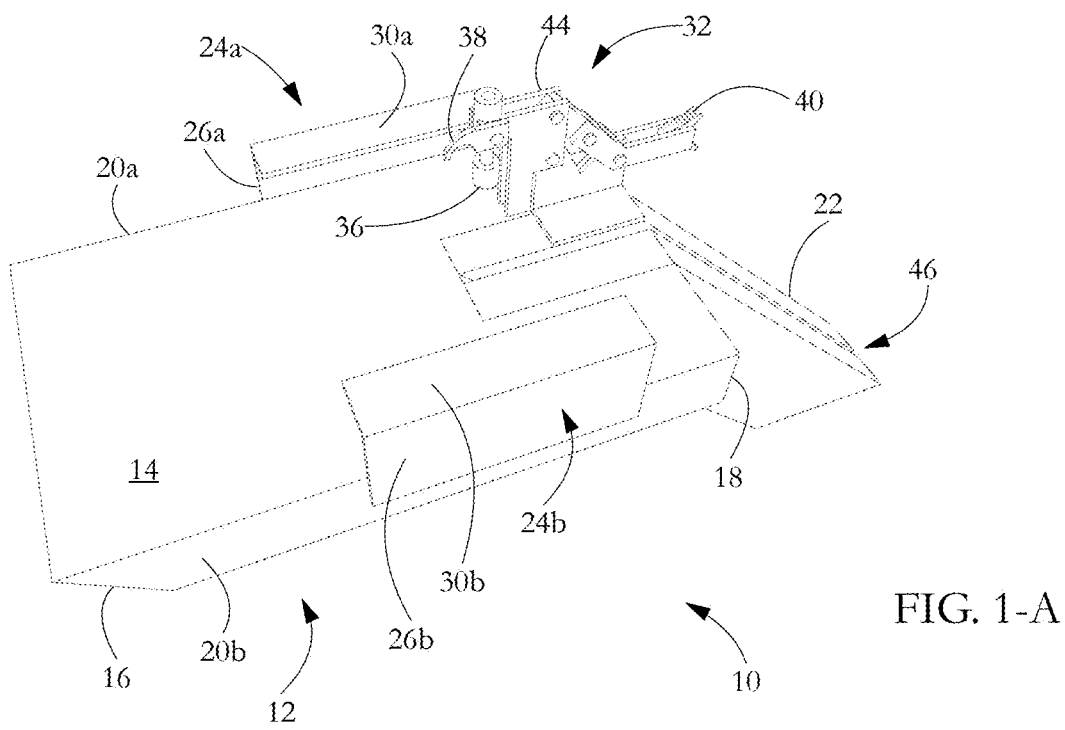
FIG. 1-A
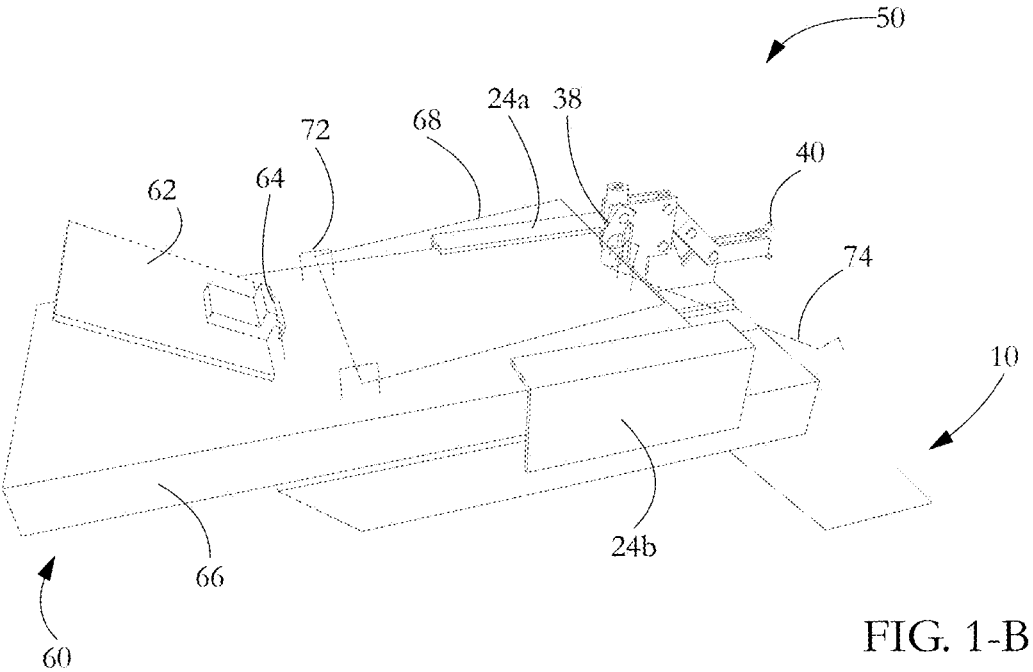
FIG. 1-B

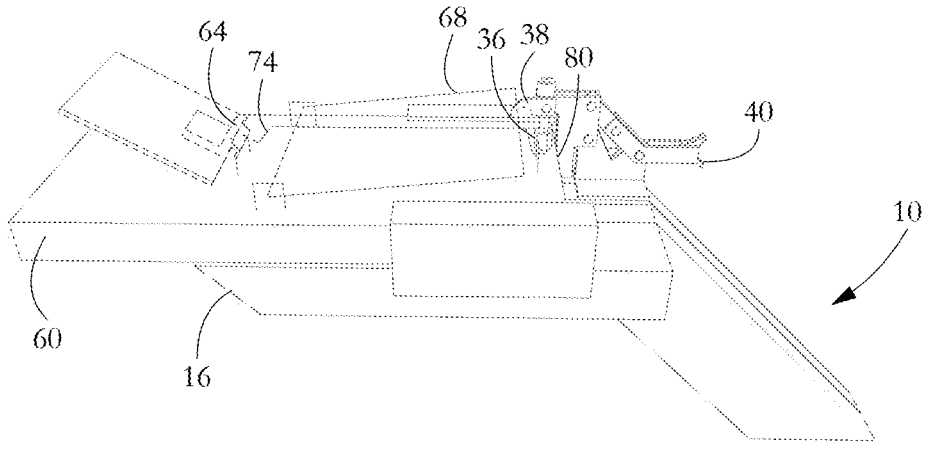
FIG. 1-C
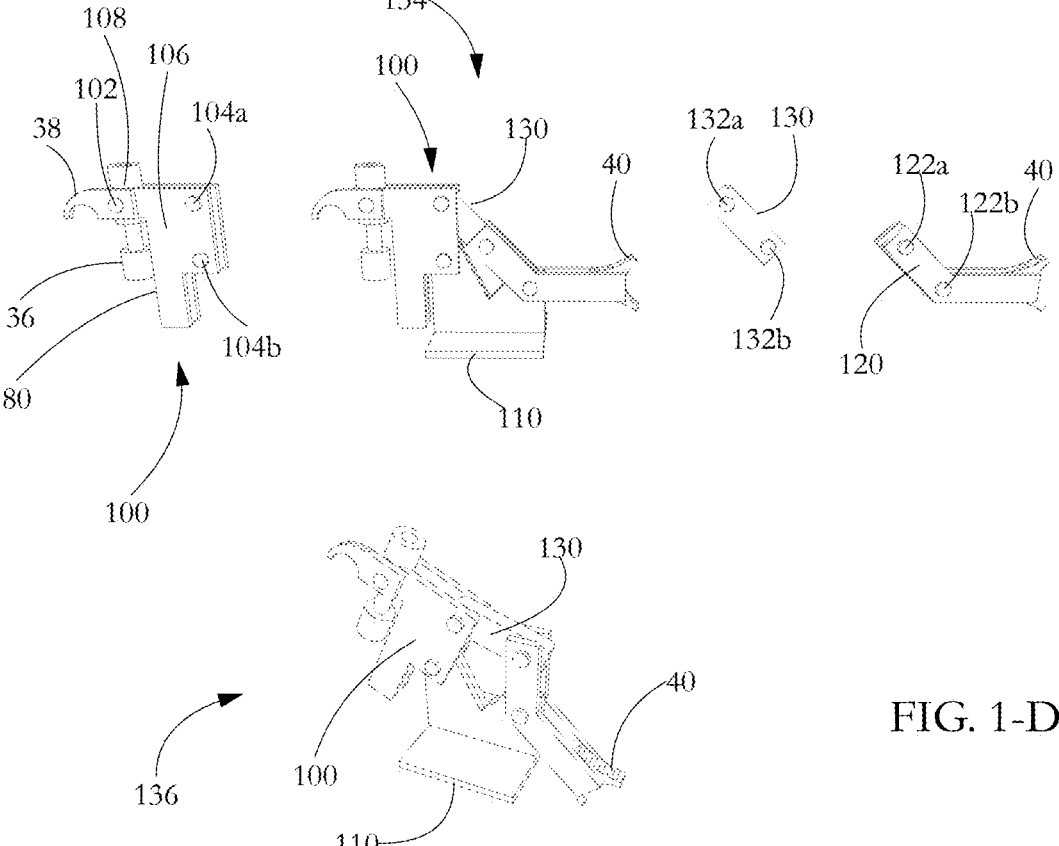
FIG. 1-D

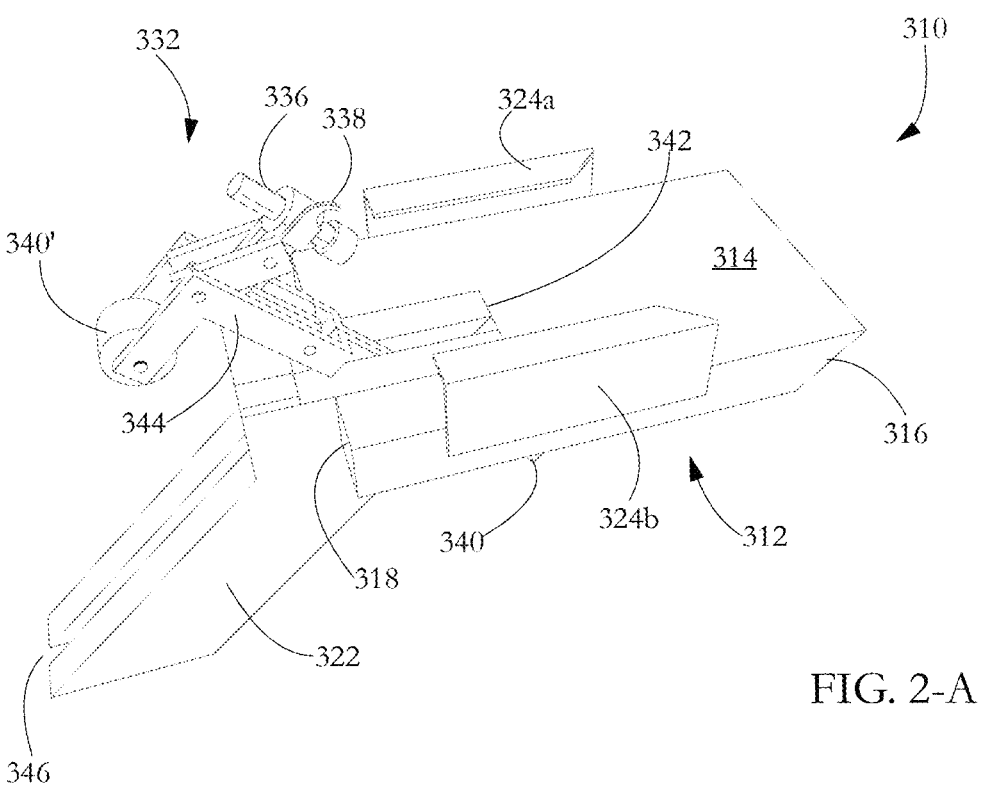
FIG. 2-A
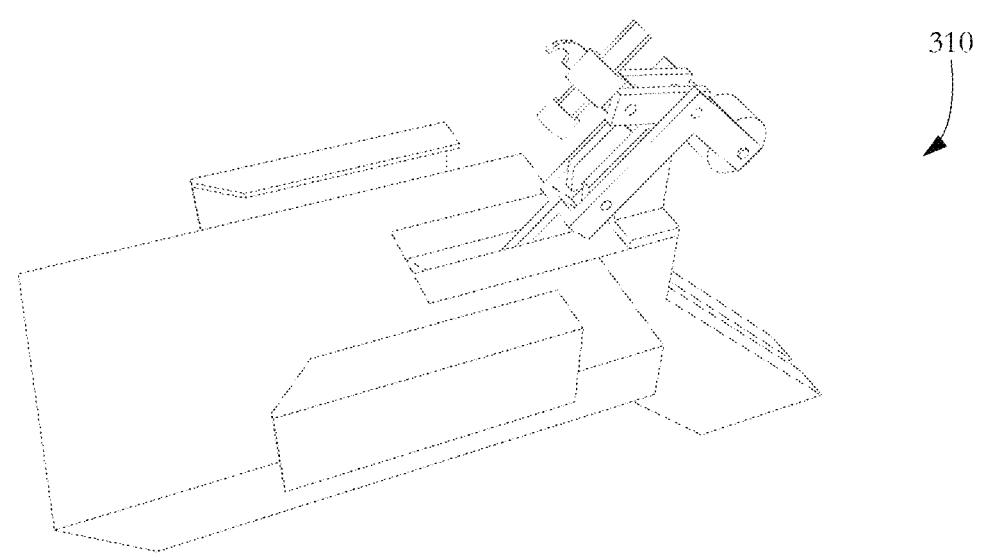
FIG. 2-B

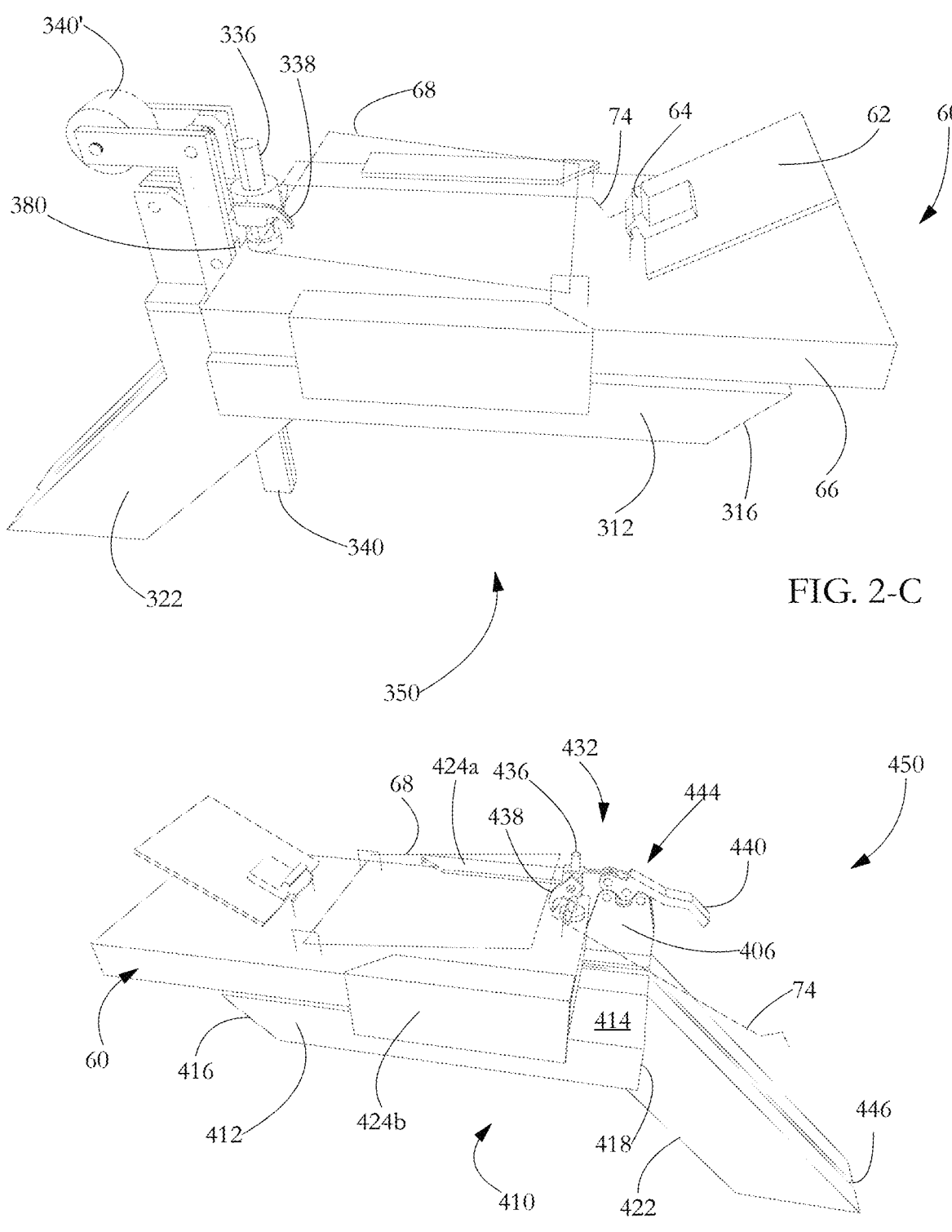
FIG. 2-C
FIG. 3-A

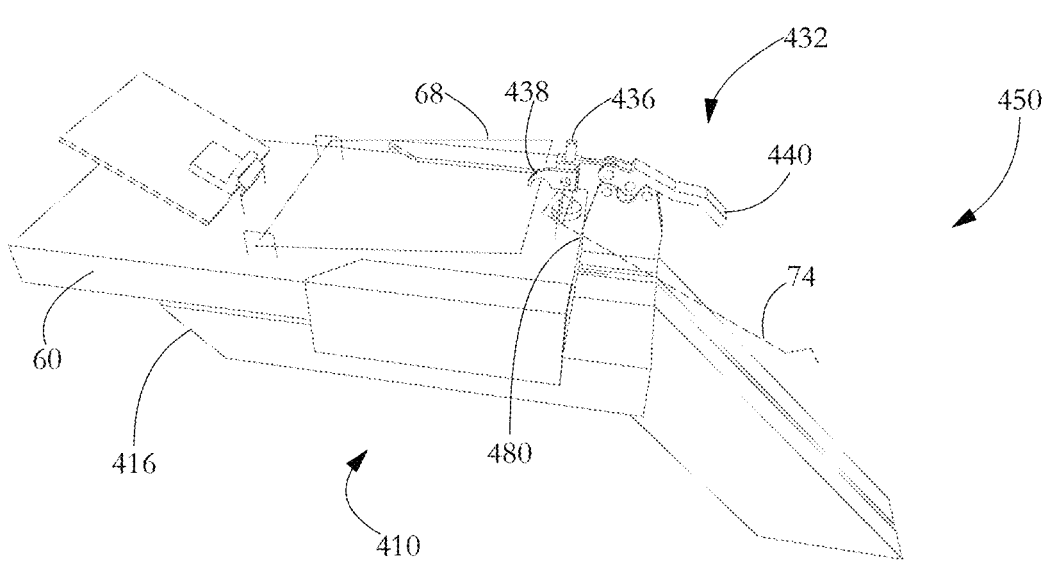
FIG. 3-B
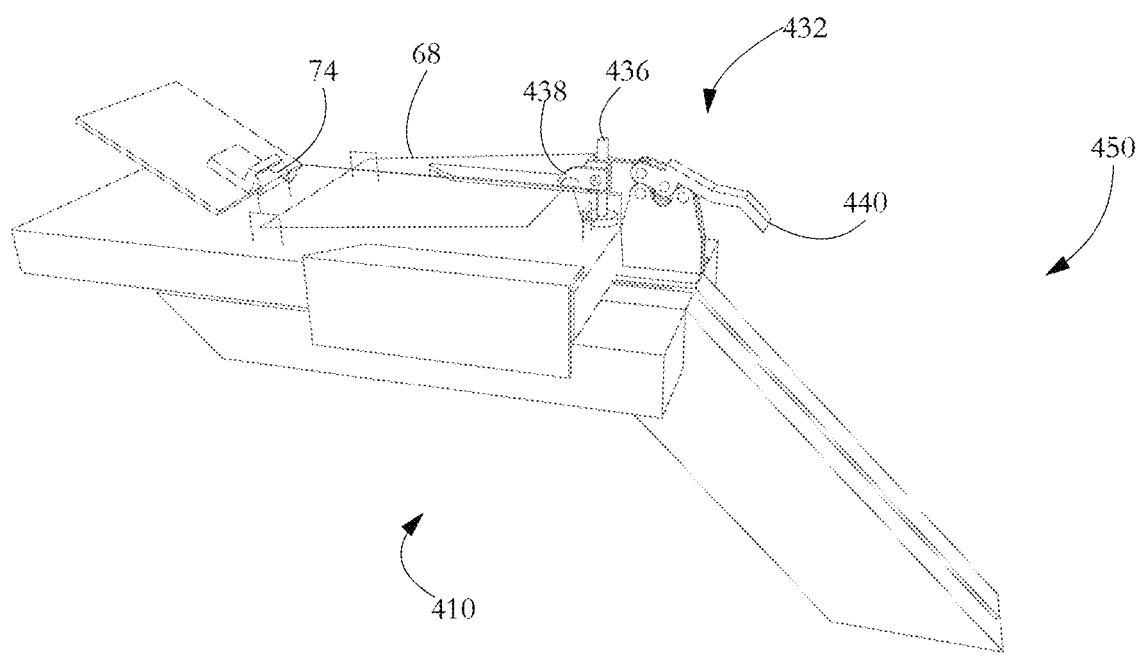
FIG. 3-C

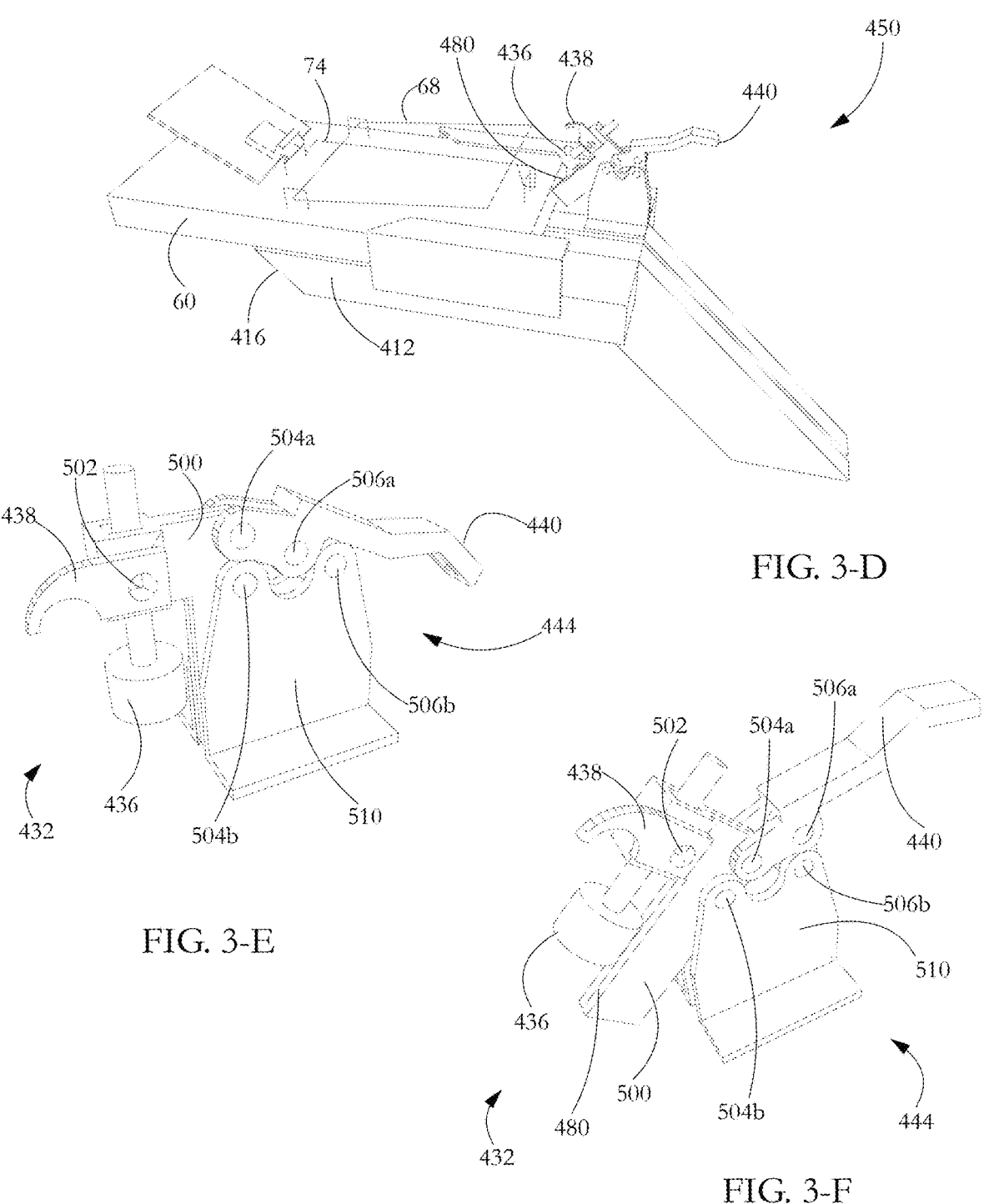
FIG. 3-D
FIG. 3-E
FIG. 3-F

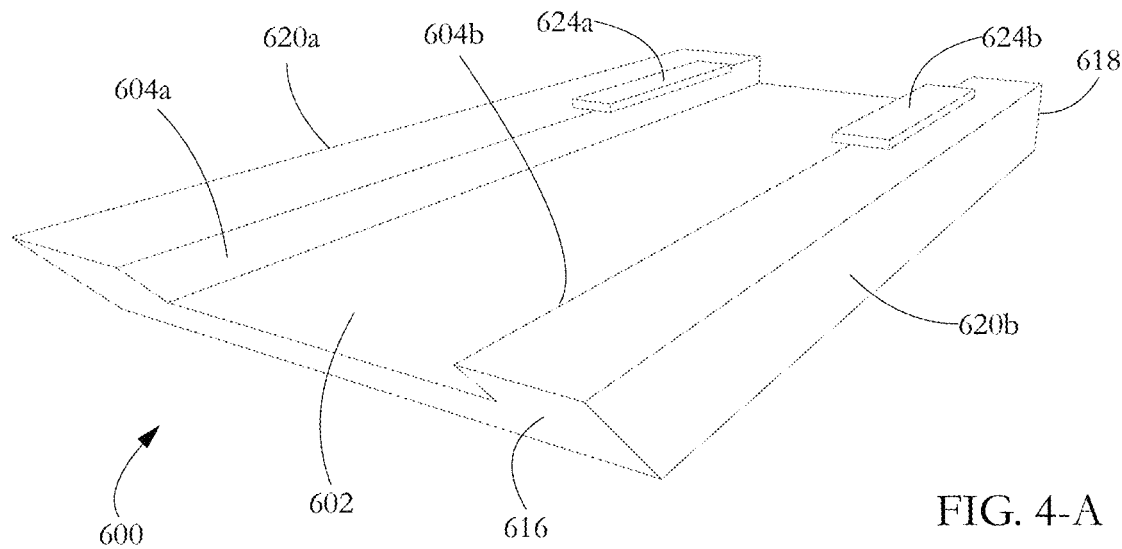
FIG. 4-A
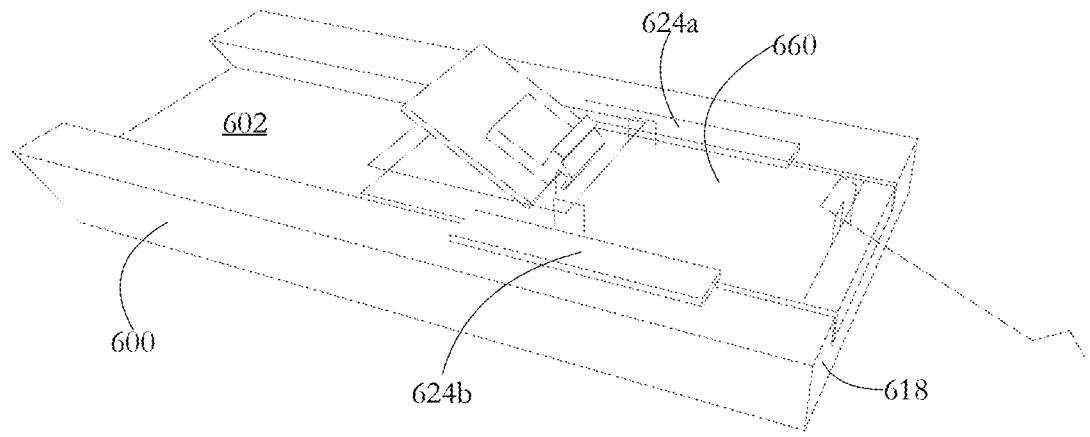
FIG. 4-B

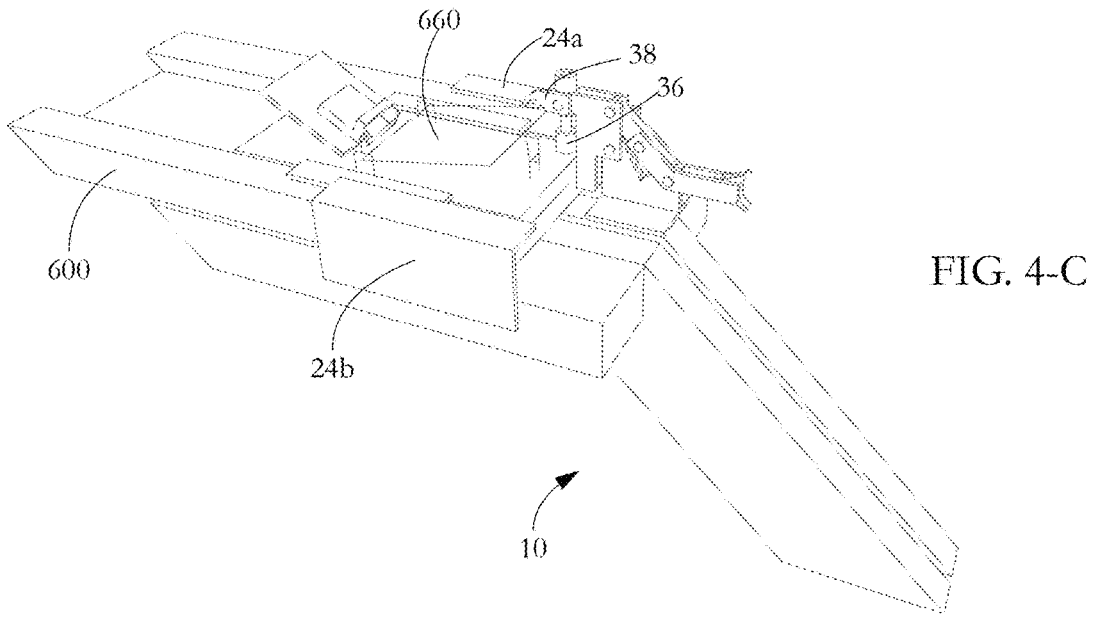
FIG. 4-C
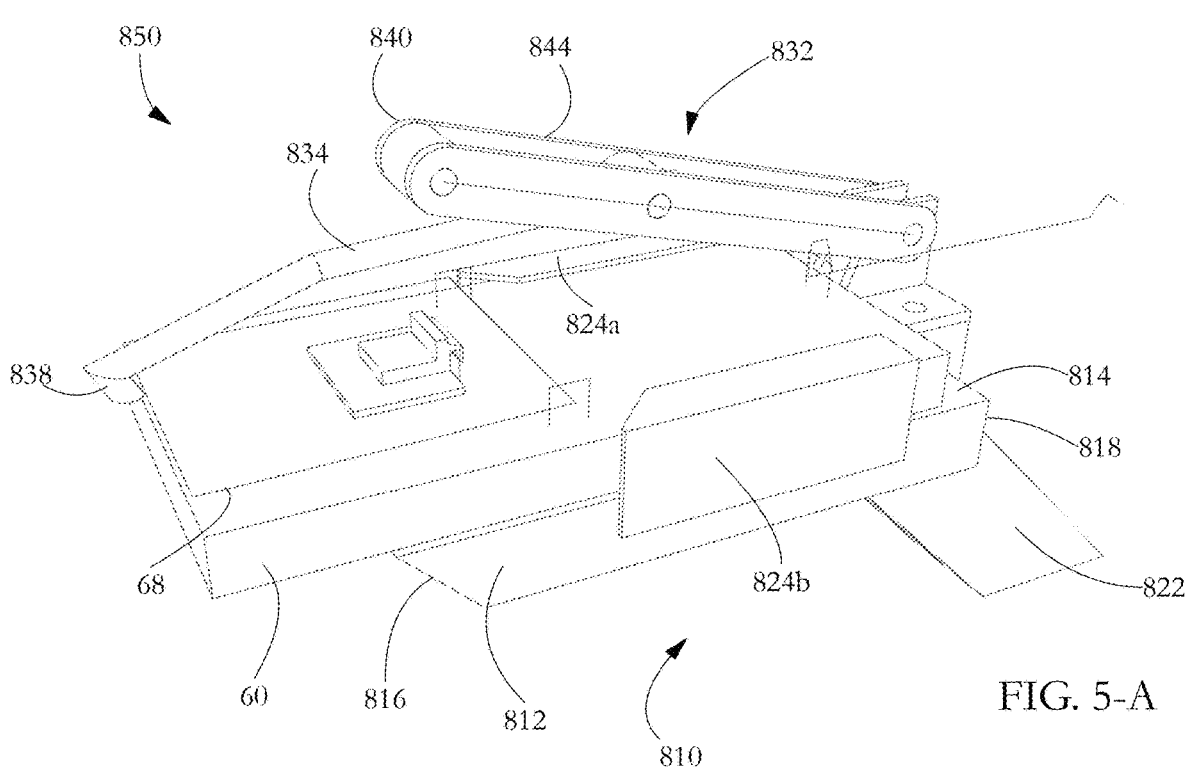
FIG. 5-A

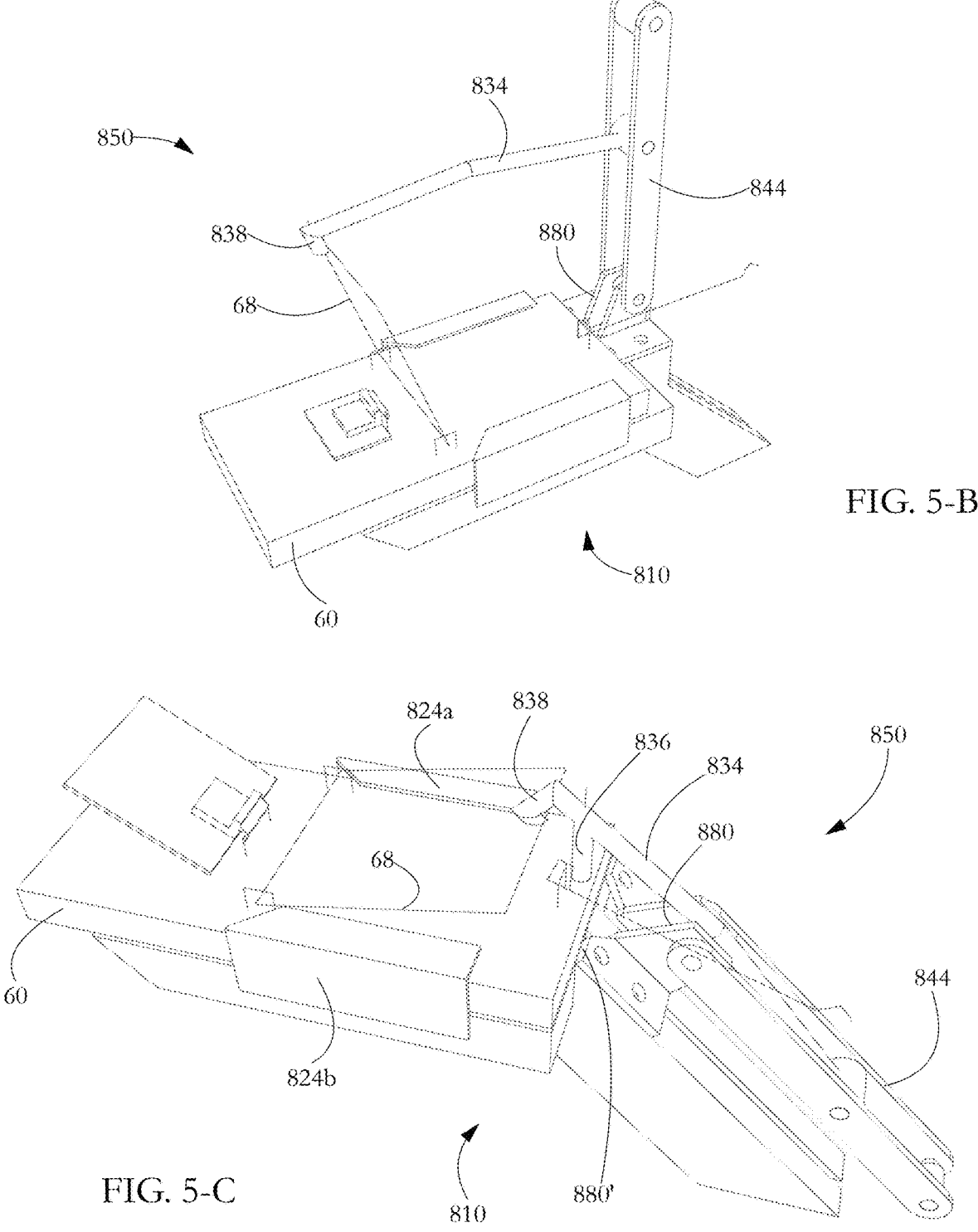
FIG. 5-B
FIG. 5-C

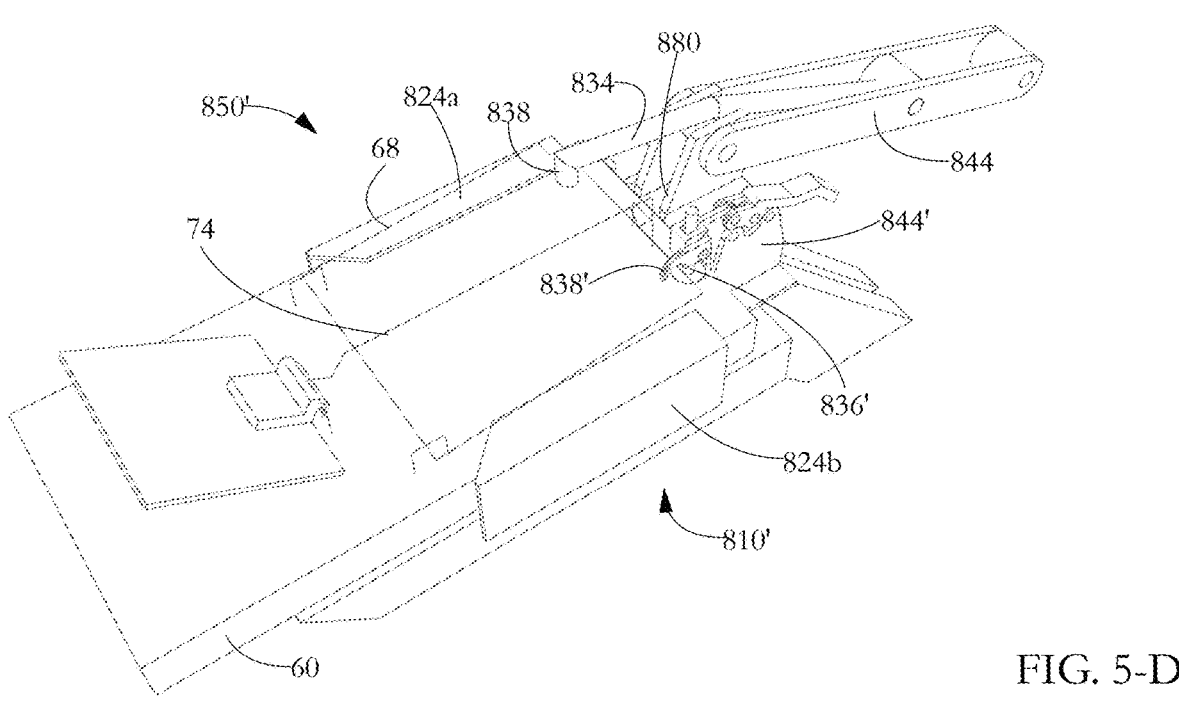
FIG. 5-D
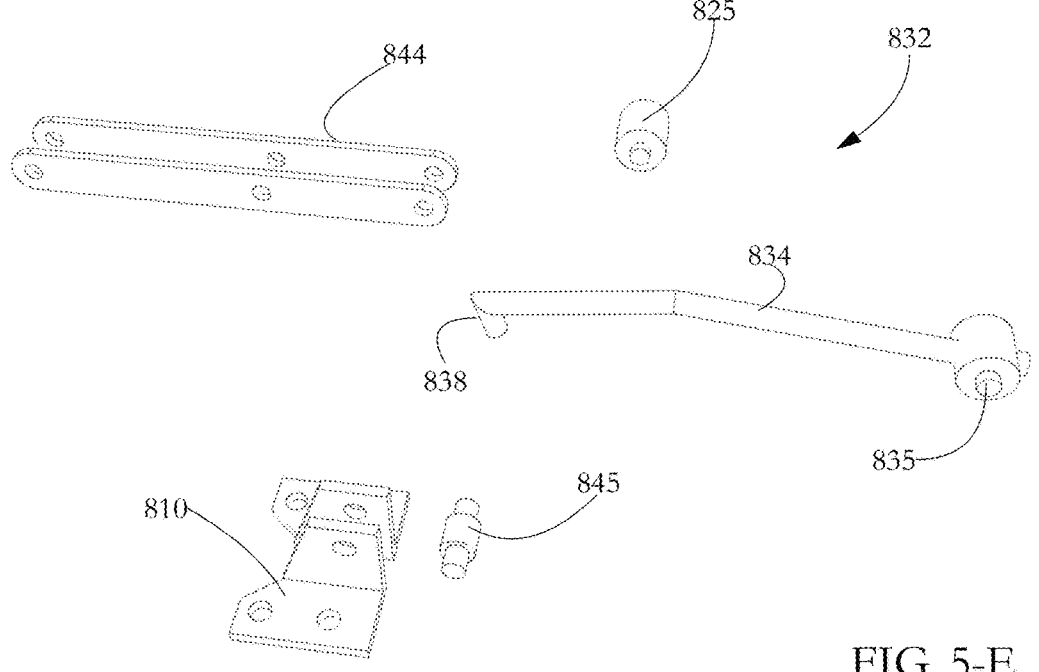
FIG. 5-E

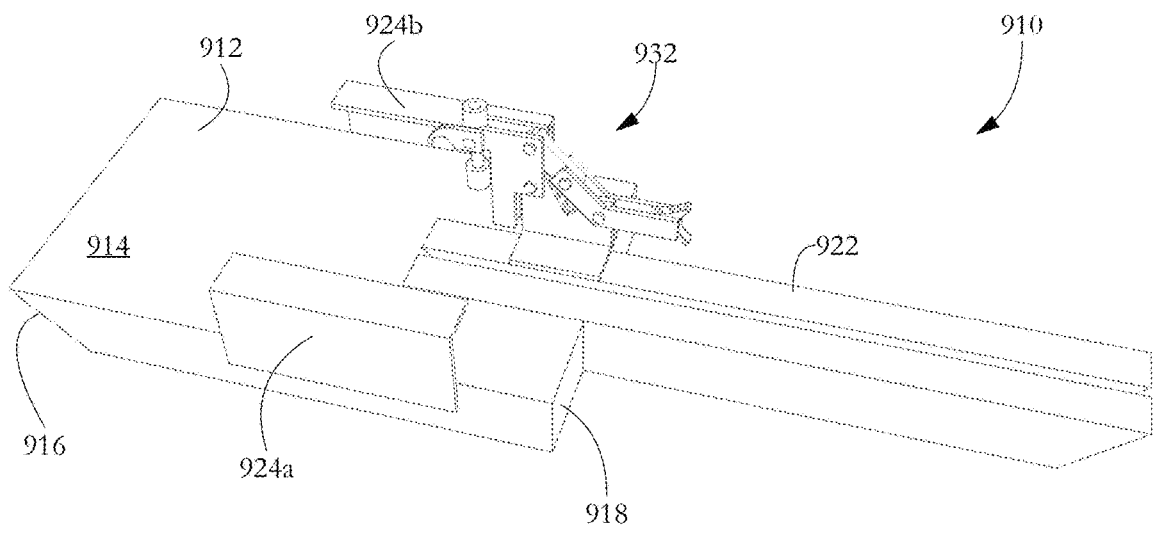
FIG. 6-A
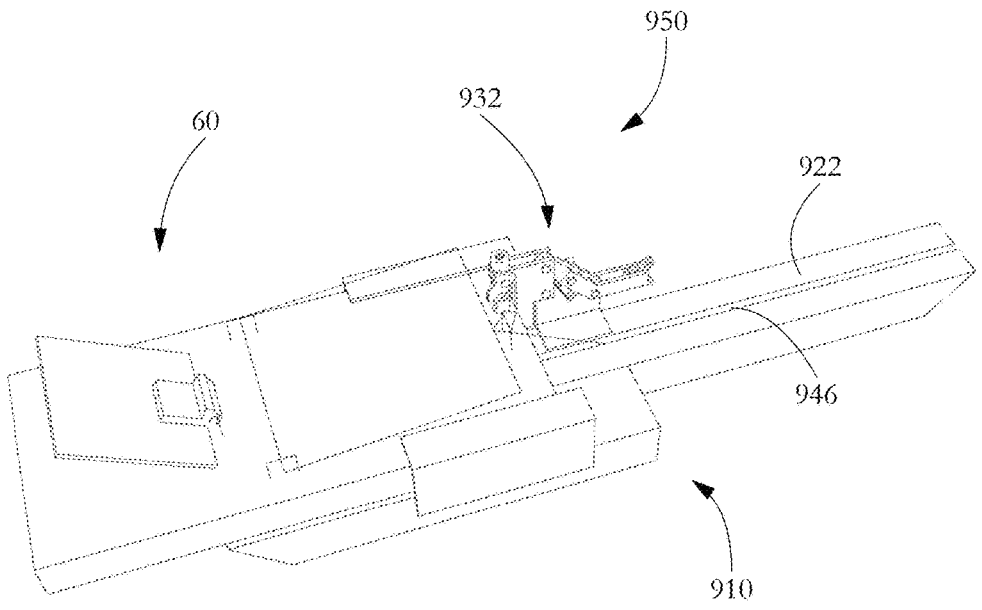
FIG. 6-B

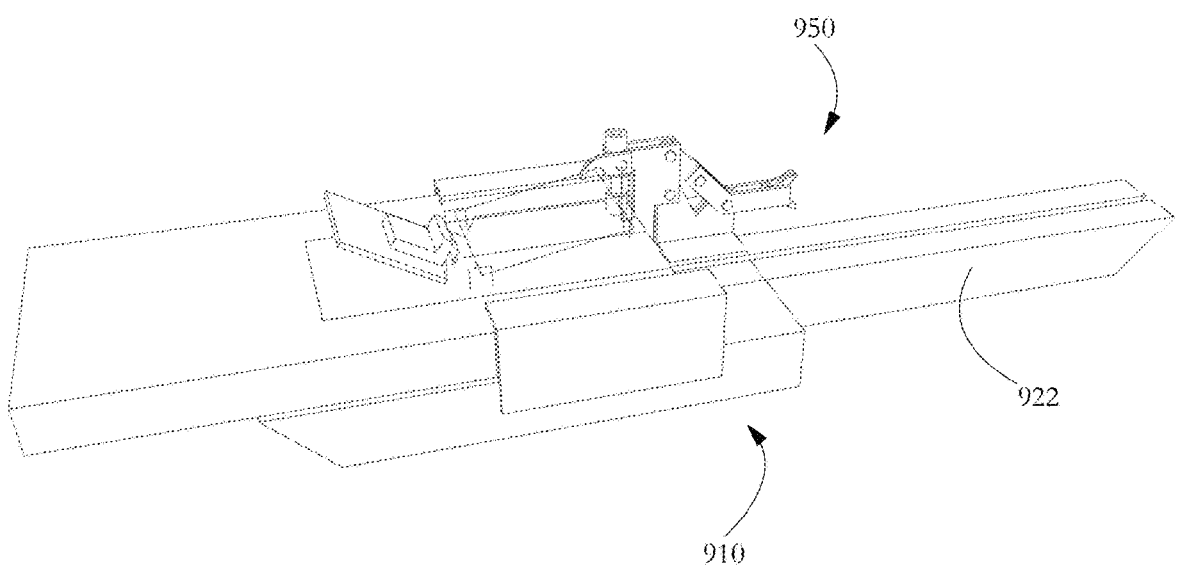
FIG. 6-C
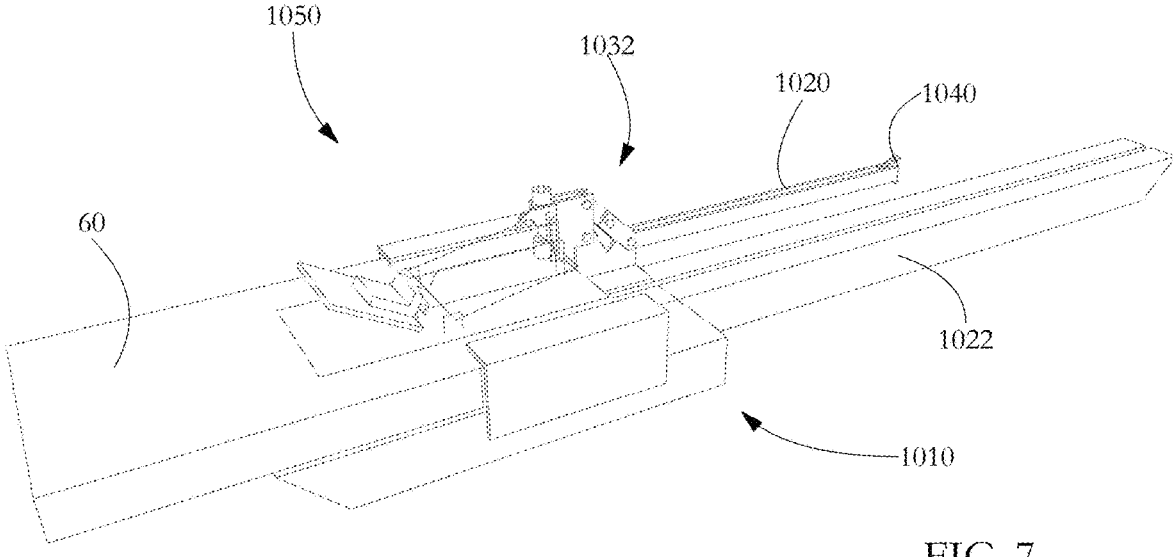
FIG. 7

FIG. 9-A

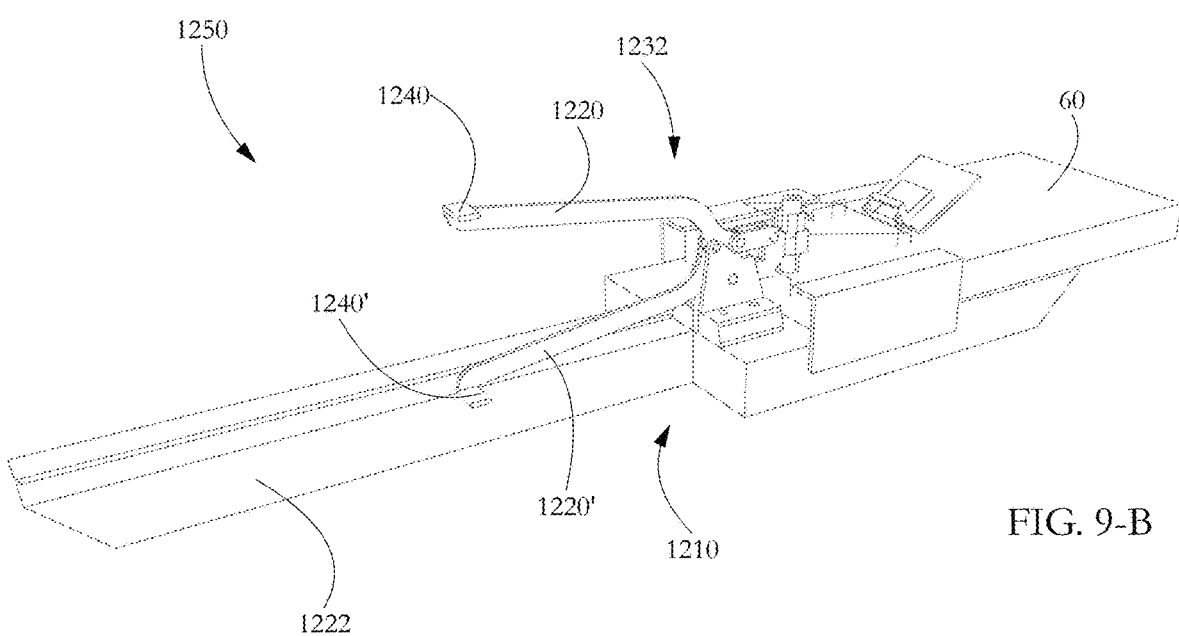
FIG. 9-B
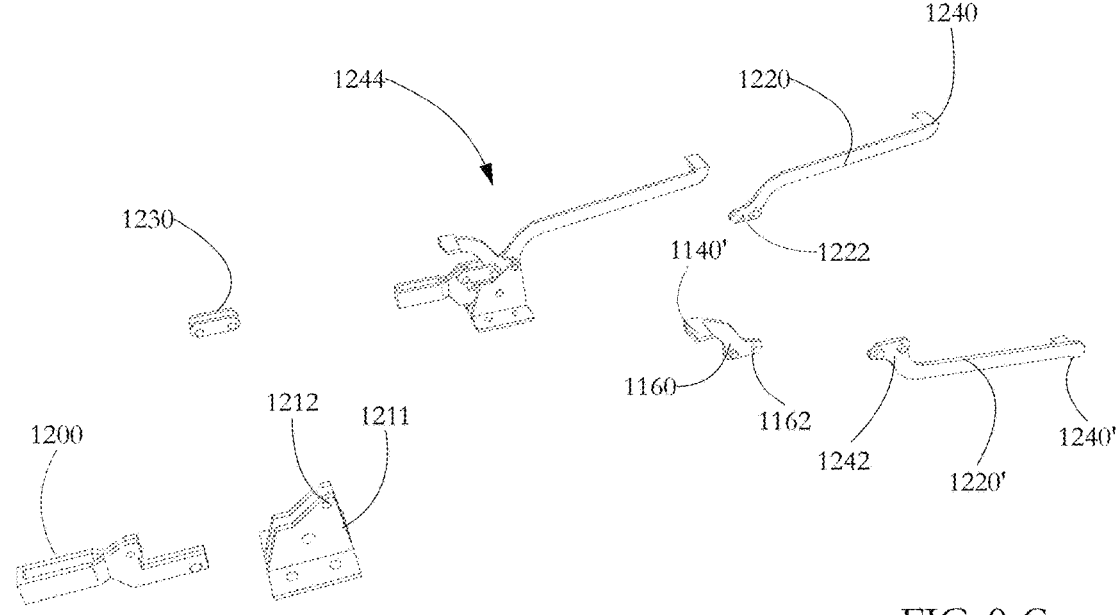
FIG. 9-C

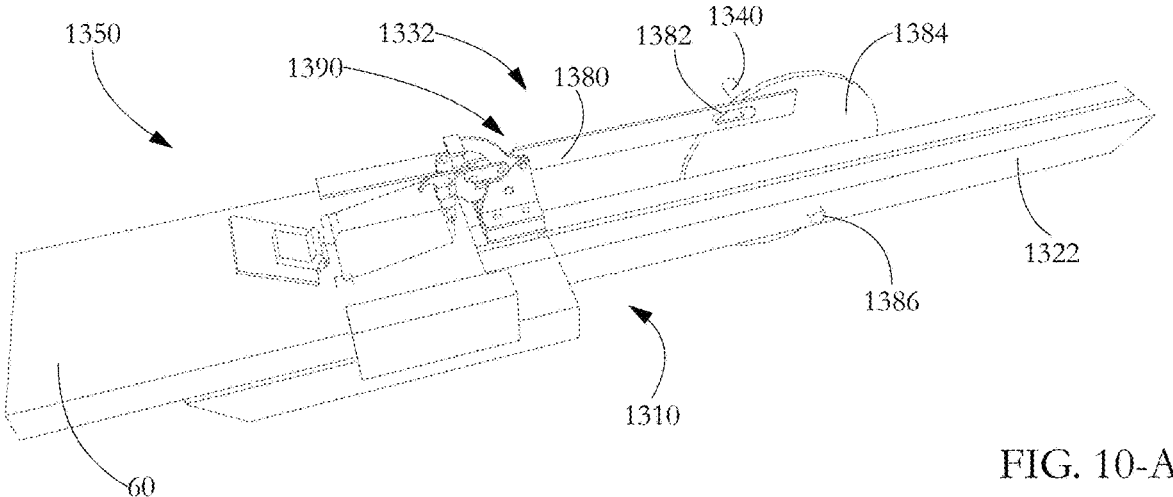
FIG. 10-A
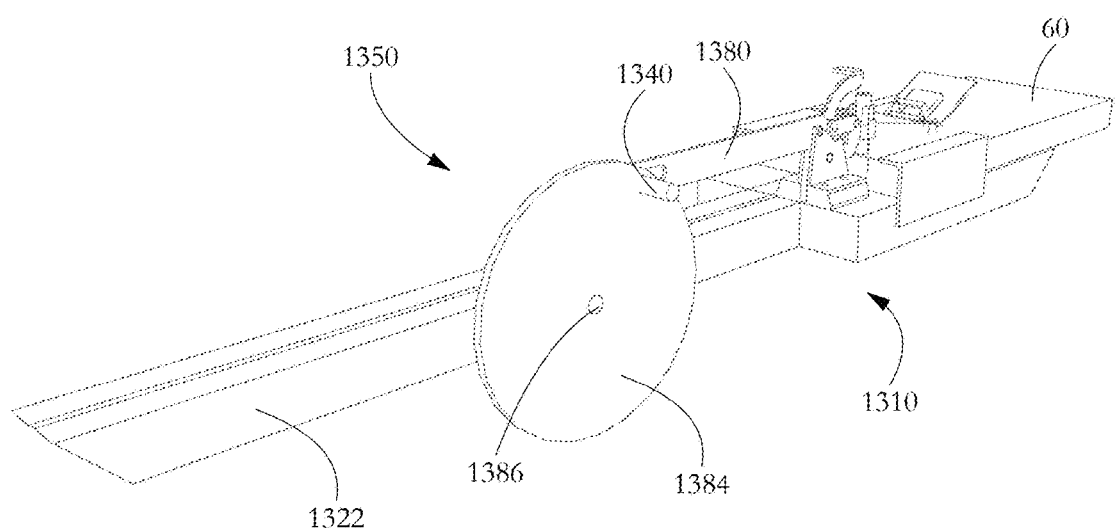
FIG. 10-B

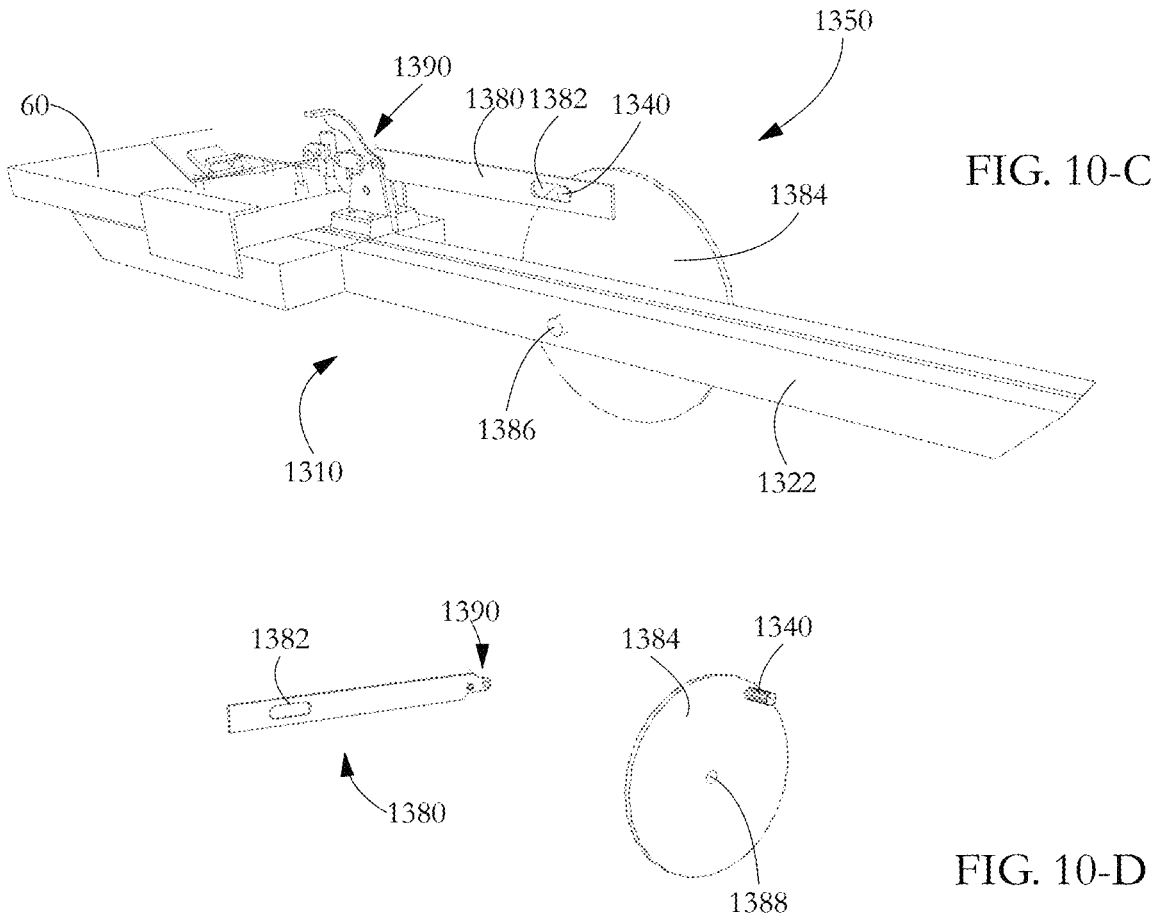
FIG. 10-C
FIG. 10-D
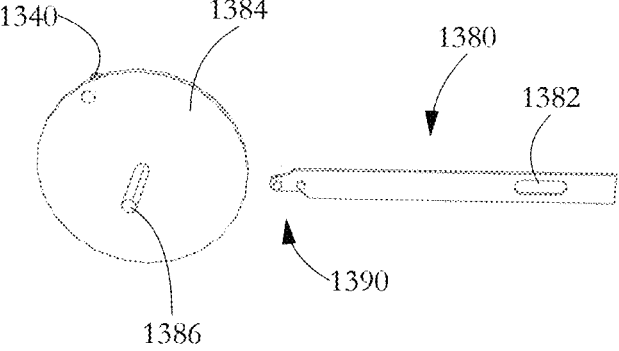
FIG. 10-E

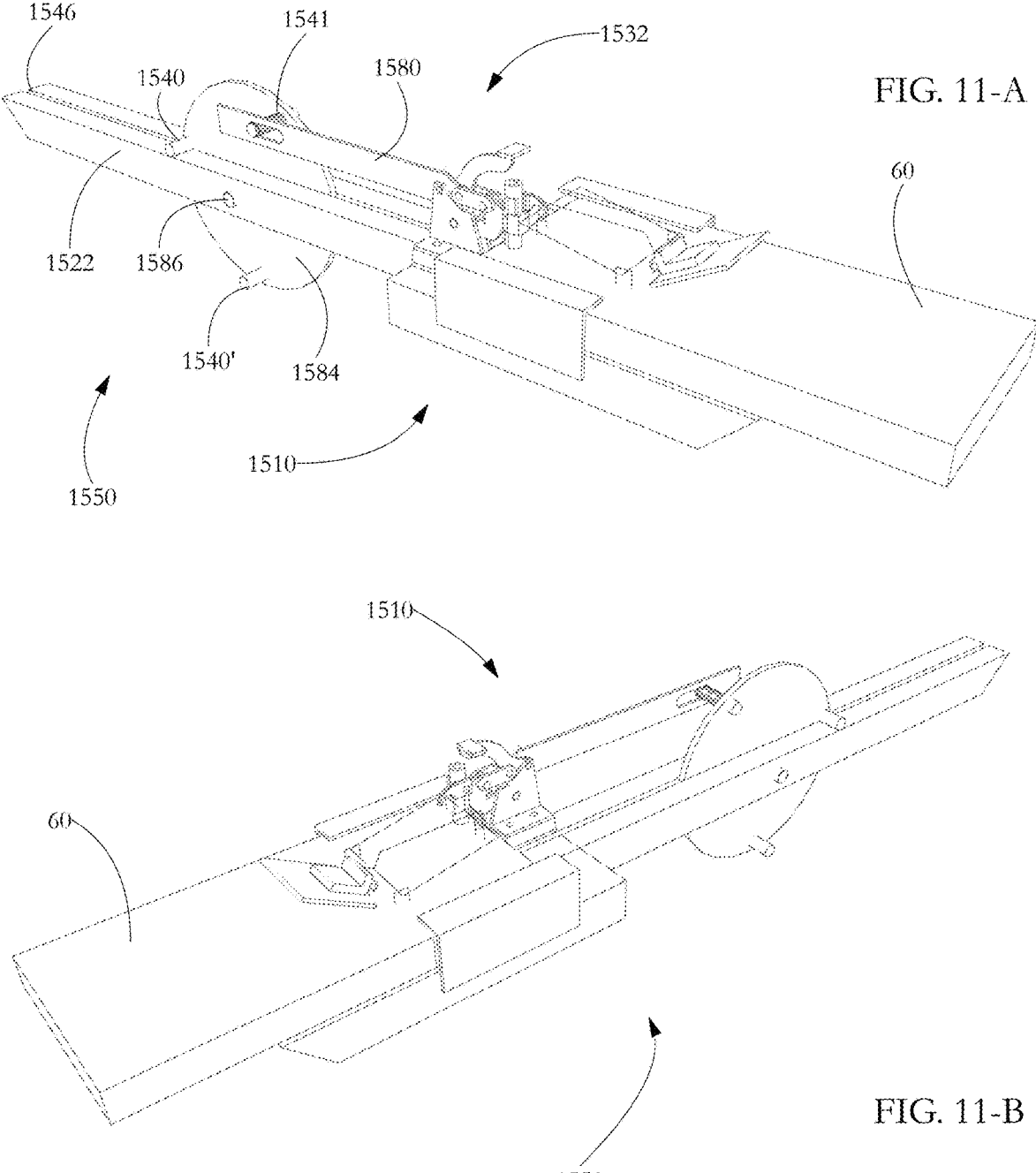
FIG. 11-A
FIG. 11-B

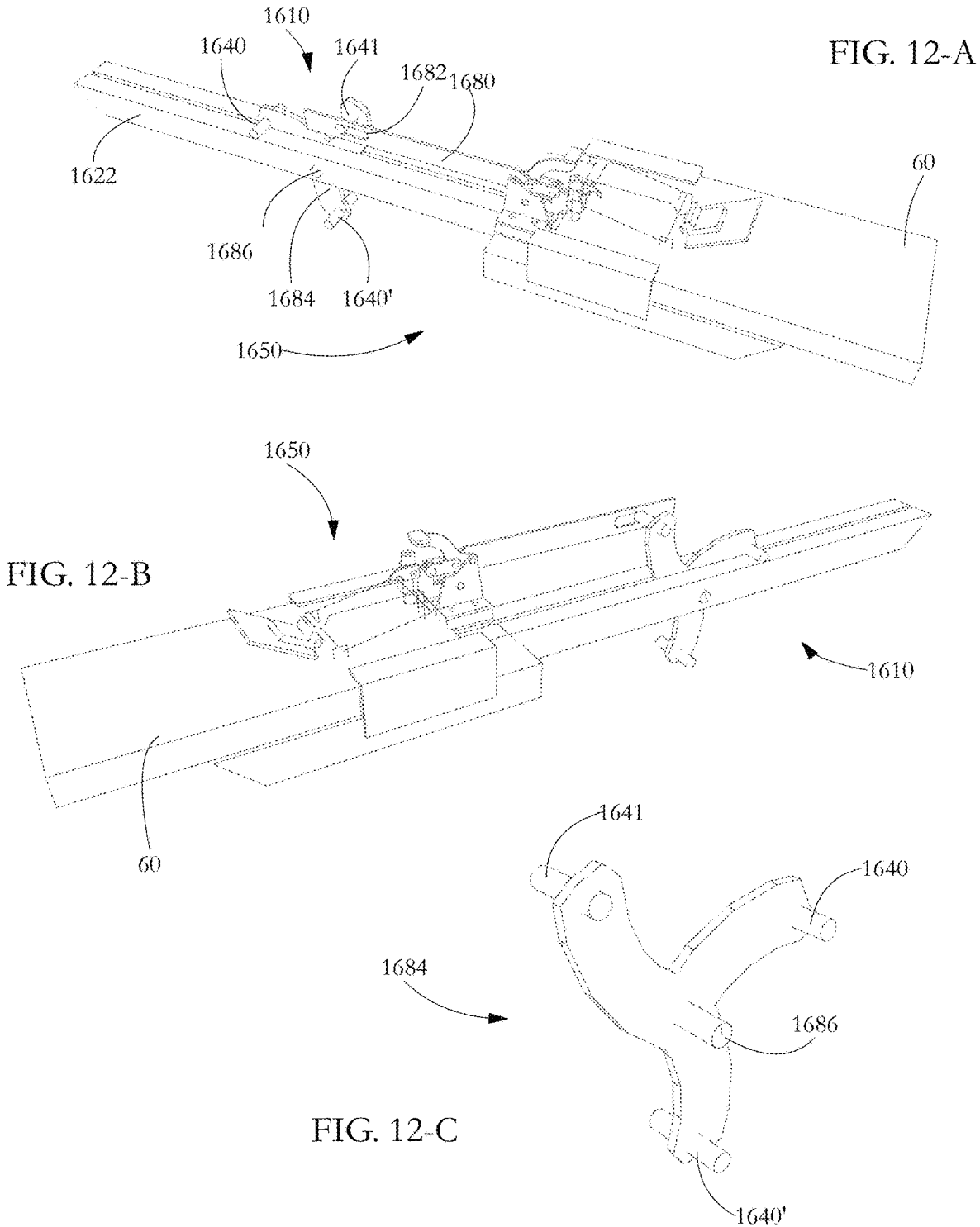
FIG. 12-A
FIG. 12-B
FIG. 12-C

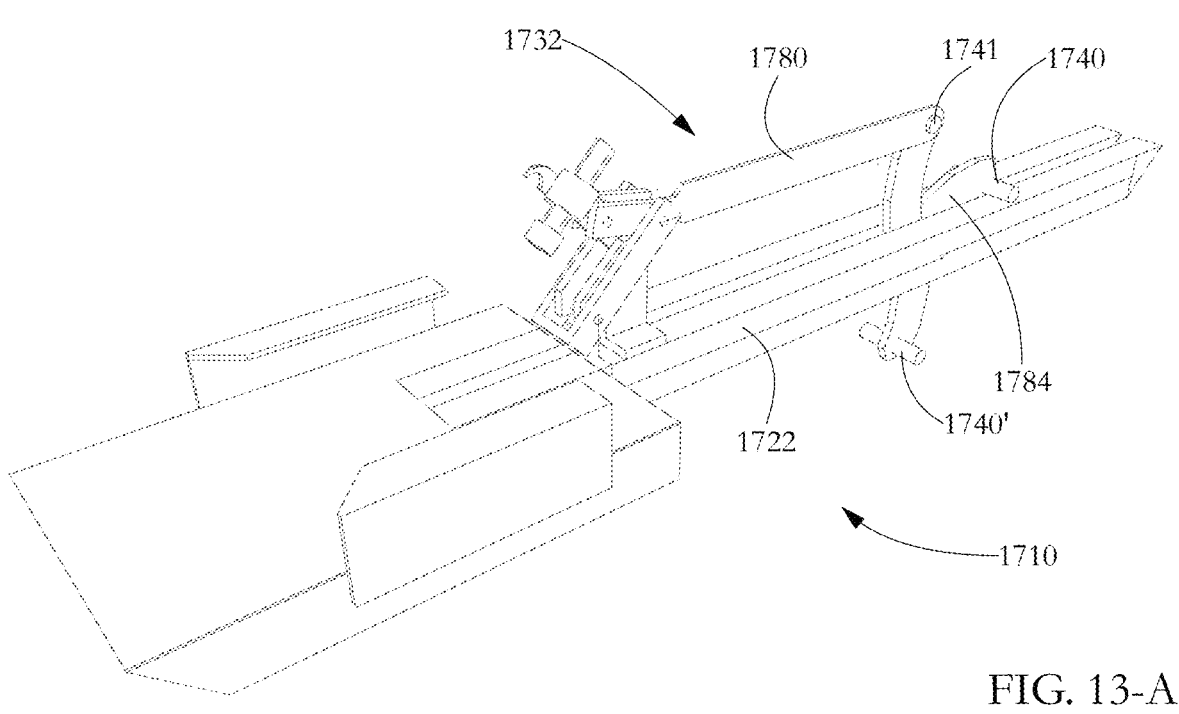
FIG. 13-A
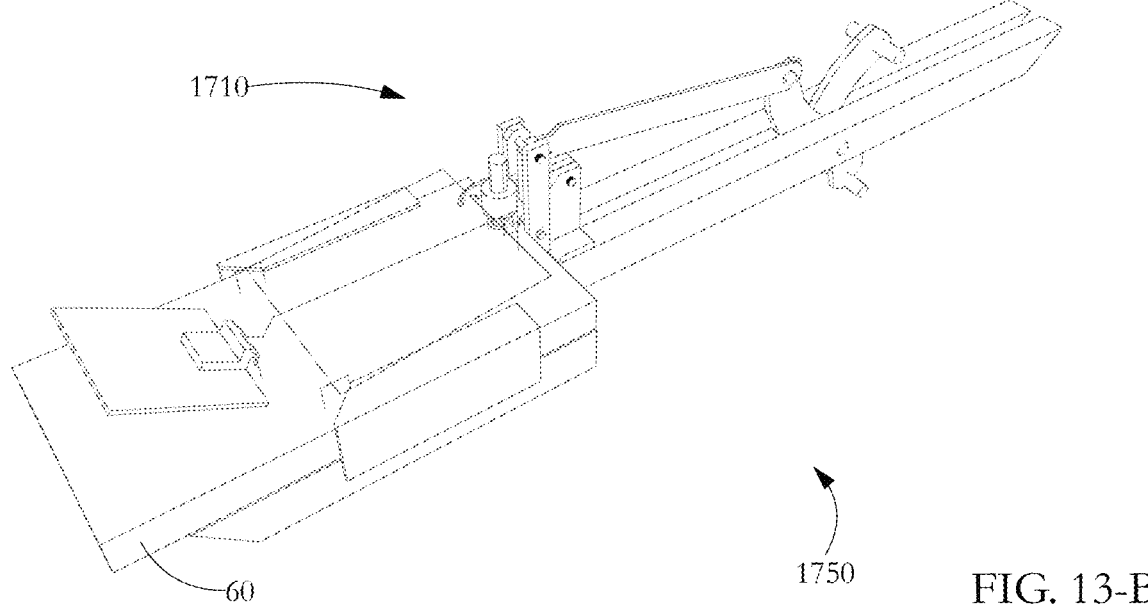
FIG. 13-B

HAND-HELD RODENT TRAP SETTING DEVICES WITH TRAP RETAINER

This application is a continuation-in-part of U.S. patent application Ser. No. 18/900,791, filed 29 Sep. 2024, entitled "Hand-Held Rodent Trap Setting Devices," which is a continuation-in-part (CIP) of U.S. patent application Ser. No. 18/793,813, filed 4 Aug. 2024, entitled "Hand-Held Rodent Trap Setting Device," which are incorporated herein by reference.

BACKGROUND

Background

The invention relates to rodent control devices, and in particular to devices for facilitating setting rat and mouse traps.

A common rat trap design includes a U-shaped, spring-loaded kill bar held down by an arm bar. A rodent attempting to retrieve bait dislodges the arm bar, which allows the kill bar to snap down onto the rodent.

Setting up, transporting and positioning such rat traps can be difficult and frightening. To prevent rodents from getting the bait without triggering the trap, the arm bar placement is commonly sensitive to small movements of the trigger paddle, which increases the risk of the kill bar snapping onto the user's hand while the trap is being set. A number of US patents describe various approaches to making rodent traps safer and easier to use.

In U.S. Patent Publication No. 2006/0064922, Crispens et al. describe a safety arm that prevents accidental discharge of the bow of a spring-loaded mouse trap. A user can rotate the safety arm with a lever to permit the bow of the mouse trap to rotate unimpeded after the trap is set.

In U.S. Pat. No. 4,825,579, Dzurkovich et al. describe a disposable cartridge assembly for use with a rodent trap. A rodent enters a sleeve mounted adjacent to the trap trigger, activates the trigger and is trapped. The entire assembly is then disposed. The assembly includes a safety catch that may be slipped over the trap crossbar to prevent the striker from releasing prematurely and striking the user's fingers.

In U.S. Pat. No. 6,199,314, Ballard describes a housing adapted to receive a platform of a conventional mouse trap. A cocking handle includes a pair of handle arms attached to pivotal connections on the side, and terminating at a cross bar. A pair of bow-urging arms are also attached to the pivotal connections. By rotating the cocking handle, the bow urging arms urge the bow to a cocked position. A catch member is pivoted inward to maintain the bow in the cocked position until the locking arm of the mouse trap is engaged in the bait pedal of the mouse trap.

SUMMARY

According to one aspect, a hand-held rodent trap-setting device includes: a base for supporting a platform of a rodent trap; a handle coupled to the base, for allowing a user to hold the trap-setting device; and a releasable trap retainer coupled to the base or the handle and configured to releasably engage the rodent trap platform or an arm bar structure of the rodent trap to secure the rodent trap to the base, for facilitating an arming of the rodent trap while the rodent trap is secured to the base.

According to another aspect, a method of setting a rodent trap comprises: holding a handle of a hand-held rodent trap-setting device in a first hand, the handle being coupled to a base of the trap-setting device; releasably securing a rodent trap to the base by sliding a rodent trap platform onto the base, and employing a releasable retainer coupled to the base or the handle to engage the rodent trap platform or an arm bar structure of the rodent trap; arming the rodent trap while secured to the base; and releasing the rodent trap from the base for deployment at a deployment location.

BRIEF DESCRIPTION OF THE DRAWINGS

The foregoing aspects and advantages of the present invention will become better understood upon reading the following detailed description and upon reference to the drawings where:

FIG. 1-A shows an isometric view of a hand-held rodent trap setting device according to some embodiments of the present invention.

FIG. 1-B shows an isometric view of the hand-held rodent trap setting device of FIG. 1-A holding a rodent trap while the rodent trap is being armed, according to some embodiments of the present invention.

FIG. 1-C shows an isometric view of the hand-held rodent trap setting device and rodent trap of FIG. 1-B with the rodent trap in a set configuration, according to some embodiments of the present invention.

FIG. 1-D shows isometric views of parts of a linking assembly (e.g. modified toggle clamp) of the hand-held rodent trap setting device of FIG. 1-A according to some embodiments of the present invention.

FIGS. 2-A-B show isometric views of another hand-held rodent trap setting device according to some embodiments of the present invention.

FIG. 2-C shows an isometric view of the hand-held rodent trap setting device of FIGS. 2-A-B and a rodent trap with the rodent trap in an armed configuration, according to some embodiments of the present invention.

FIG. 3-A shows an isometric view of another hand-held rodent trap setting device while the kill bar slides past a safety catch according to some embodiments of the present invention.

FIG. 3-B shows an isometric view of the trap setting device of FIG. 3-A while the kill bar is secured by a safety catch and before an arm bar secures the kill bar, according to some embodiments of the present invention.

FIG. 3-C shows an isometric view of the trap setting device of FIG. 3-A while the kill bar is secured by a safety catch and after an arm bar secures the kill bar, according to some embodiments of the present invention.

FIG. 3-D illustrates a release of the armed rodent trap from the trap setting device of FIG. 3-C according to some embodiments of the present invention.

FIGS. 3-E-F show isometric views of a clamping arm assembly of the trap-setting device of FIGS. 3-A-D in closed and open configurations, respectively, according to some embodiments of the present invention.

FIG. 4-A shows an isometric view of mouse trap adapter that can be used in conjunction with a rat trap setting device as shown in FIGS. 1-A-3-F according to some embodiments of the present invention.

FIG. 4-B shows an isometric view of a mouse trap disposed within the mouse trap adapter of FIG. 4-A according to some embodiments of the present invention.

FIG. 4-C shows an isometric view of a mouse trap disposed within the mouse trap adapter of FIG. 4-A, which is in turn secured within a rat trap setting device as shown in FIGS. 1-A-D according to some embodiments of the present invention.

FIG. 5-A shows an isometric view of a hand-held rodent trap setting device having a pulling arm in an initial configuration, prior to the rodent trap arm being set, according to some embodiments of the present invention.

FIG. 5-B shows an isometric view of the hand-held rodent trap setting device of FIG. 5-A holding a rodent trap while the rodent trap is being armed, according to some embodiments of the present invention.

FIG. 5-C shows an isometric view of a hand-held rodent trap setting device having a pulling arm and integrated clamping arm, and a rodent trap with the rodent trap in a set configuration, according to some embodiments of the present invention.

FIG. 5-D shows an isometric view of another hand-held rodent trap setting device with the rodent trap in a set configuration, according to some embodiments of the present invention.

FIG. 5-E shows isometric views of parts of a linking assembly of the hand-held rodent trap setting devices of FIGS. 5-A-B according to some embodiments of the present invention.

FIG. 6-A shows an isometric view of a flat hand-held rodent trap setting device according to some embodiments of the present invention.

FIG. 6-B shows an isometric view of the flat hand-held rodent trap setting device of FIG. 6-A holding a rodent trap while the rodent trap is being armed, according to some embodiments of the present invention.

FIG. 6-C shows an isometric view of the flat hand-held rodent trap setting device and rodent trap of FIG. 6-B with the rodent trap in a set configuration, according to some embodiments of the present invention.

FIG. 7 shows an isometric view of an assembly including a flat hand-held rodent trap setting device with an elongated handle and elongated rearward actuator arm, according to some embodiments of the present invention.

FIGS. 9-A-B show isometric views of another flat hand-held rodent trap setting device holding a rodent trap, according to some embodiments of the present invention.

FIG. 9-C shows isometric views of parts of a linking assembly of the hand-held rodent trap setting device of FIG. 9-A-B according to some embodiments of the present invention.

FIGS. 10-A-C show isometric views of a flat hand-held rodent trap setting device with an elongated handle and remote/extended actuator according to some embodiments of the present invention.

FIG. 10-D-E show isometric views of parts of a linking assembly of the hand-held rodent trap setting device of FIGS. 10-A-C according to some embodiments of the present invention.

FIGS. 11-A-B show isometric views of another flat hand-held rodent trap setting device with a remote/extended setting actuator according to some embodiments of the present invention.

FIGS. 12-A-B show isometric views of another flat hand-held rodent trap setting device with a remote/extended setting actuator according to some embodiments of the present invention.

FIG. 12-C shows an isometric view of an actuator of the hand-held rodent trap setting device of FIGS. 12-A-B according to some embodiments of the present invention.

FIGS. 13-A-B show isometric views of another flat hand-held rodent trap setting device with a remote/extended setting actuator according to some embodiments of the present invention.

FIG. 13-C shows an isometric view of a linking assembly of the hand-held rodent trap setting device of FIGS. 13-A-B according to some embodiments of the present invention.

FIG. 17-B shows the spring-loaded retainer of FIG. 17-A according to some embodiments of the present invention.

FIG. 17-C shows the release/ejection actuator of FIG. 17-A according to some embodiments of the present invention.

FIG. 18-B shows an exemplary spring-loaded safety catch according to some embodiments of the present invention.

FIG. 21-B shows the rodent trap arming tool of FIG. 21-A in an armed position according to some embodiments of the present invention.

DETAILED DESCRIPTION

Figure 8:
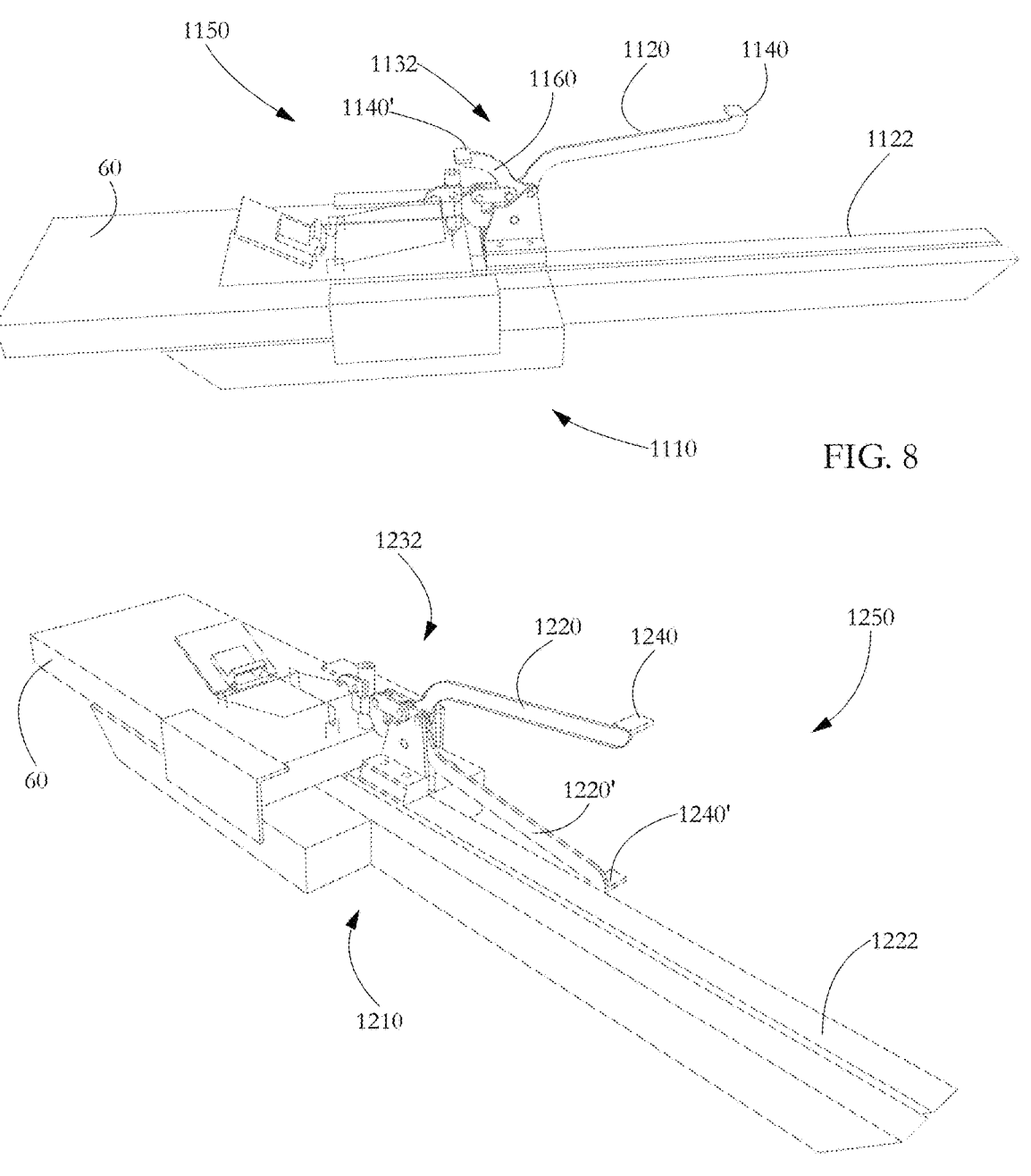
FIG. 8 shows an isometric view of another flat hand-held rodent trap setting device according to some embodiments of the present invention.

The following description illustrates the present invention by way of example and not necessarily by way of limitation. A set of elements includes one or more elements. A plurality of elements includes two or more elements. Any recitation of an element is understood to refer to at least one element. Unless otherwise required, any described method steps need not be necessarily performed in a particular illustrated order. Any recited connection encompasses a direct connection as well as an indirect connection through an intermediary structure. An actuator is a lever, button, member or other mechanical structure that actuates (initiates and/or causes a movement of) other structures, such as a clamping arm, that are coupled to the actuator. An actuator need not be, and in preferred embodiments is not, powered by electrical or pneumatic forces; in some embodiments an actuator may be powered and controlled by a human hand applying force. Releasably engaging and securing a rodent trap to a base of a trap-setting device means that the rodent trap is user-releasably coupled to the base via pressure and/or friction such that the trap does not slide out of the device while the trap is being armed and when the device is tilted, and does not encompass permanent or semi-permanent attachment such as via glue, rivets or nails, which would lead to damaging the device to undo, or screws or nuts/bolts, which would generally require a tool such as a screwdriver or wrench. An arm bar structure of a rodent trap includes an arm bar and a hinge connecting the arm bar to a rodent trap platform. In the description below, a trap retainer configured to engage a rodent trap platform or arm bar structure of the rodent trap is distinct from a safety catch configured to prevent a kill bar from snapping. Any element described below that does not use the word "means for" describes structure.

FIG. 1-A shows an isometric view of a hand-held rodent trap setting device 10 according to some embodiments of the present invention. Trap setting device 10 includes a base 12 having a planar upper surface 14 configured to support a rodent trap 60, shown in FIG. 1-B. As shown in FIG. 1-A, base 12 has a beveled/angled front/distal surface 16, shaped to facilitate setting down the trap on the floor after arming, as described below. A rear/proximal surface 18 of base 12 faces the arm of an end user holding trap setting device 10 during its operation. Opposite lateral faces 20a-b of base 12 extend laterally between front surface 16 and rear surface 18. As illustrated, base 12 may have a continuous/solid upper surface 14. In some embodiments, upper surface 14 may be shaped as a frame having one or more internal openings.

A handle 22 is attached to base 12 along the rear side of base 12, and extends generally downward and outward from base 12. A pair of lateral trap guides 24a-b are situated opposite each other along corresponding lateral sides 20a-b. Trap guides 24a-b include corresponding vertical sides 26a-b mounted on and extending upward from base 12, and horizontal covers 30a-b extending inward from vertical sides 26a-b. Horizontal covers 30a-b are separated from upper surface 14 by a vertical distance slightly larger than the thickness of the platform of a rodent trap, so that the platform may be slid under and kept in place by horizontal covers 30a-b.

A trap retainer is formed by a clamping arm assembly 32 attached to base 12 along the rear side of base 12, and configured to engage rodent trap 60 to secure rodent trap 60 to base 12. Clamping arm assembly 32 extends generally upward from base 12, above upper surface 14. Clamping arm assembly 32 may be a modified toggle clamp, in particular modified to include a backstop as described below. Clamping arm assembly 32 includes a vertical clamping arm (clamping bar) 36 having a tip (pad) made of rubber or similar adherent and/or elastic material, adjustable vertically and configured to press down and secure the rodent trap platform between clamping arm 36 and base 12. The resting position of clamping arm 36 (i.e. its vertical excursion range, as described below) may be vertically adjustable via a threaded attachment or other height adjustment so that the height of clamping arm 36 may be set to match one of several particular rodent trap thicknesses.

Clamping arm assembly 32 further includes a spring-loaded kill bar safety catch (extension) 38 mounted on a horizontal pivot, configured to secure the rodent trap kill bar while the rodent trap is being set, as described in detail below. Safety catch 38 is mounted on or along clamping arm 36, such that safety catch 38 and clamping arm 36 move jointly in response to the user operating an actuator, described below. In some embodiments, safety catch 38 may be mounted directly on clamping arm 36, or on a body/extension onto which clamping arm 36 is mounted. Safety catch 38 may include or be connected to a spring controlling its rotation relative to clamping arm 36, and a stop constraining the motion of safety catch 38. Clamping arm assembly 32 further includes a thumb-operated clamping arm actuator 40 extending rearwardly from base 12, and mounted on a horizontal pivot. In the illustrated embodiment, actuator 40 is or includes a lever. A linking assembly 44 comprises a plurality of linked parts, described in further detail with reference to FIG. 1-D, configured to convert a thumb-actuated vertical motion of actuator 40 into a corresponding vertical motion of clamping arm 36 and safety catch 38. A generally-longitudinal slit/aperture 46 runs along a middle of handle 22 partially or all the way down, and extends partially along top surface 14 of base 12. Slit 46 accommodates a rodent trap arm bar during a process of setting the rodent trap, as described below, to keep the rodent trap arm in place while the user is focused on other parts of the device. Slit 46 may also accommodate a trigger-type actuator, as described below with reference to FIGS. 2-A-B.

FIG. 1-B shows an isometric view of a rodent trap setting assembly 50 comprising the hand-held rodent trap setting device 10 of FIG. 1-A holding a rodent trap 60 while rodent trap 60 is being armed, according to some embodiments of the present invention. As shown, a bait station 62 and corresponding arm bar connector 64 are mounted on a rodent trap base 66, alongside a kill bar 68 and corresponding arm bar 74. Kill bar 68 is mounted on platform 66 via a spring-loaded pivot 72. As kill bar 68 is pulled up and then lowered, under tension, onto the proximal (rear) side of trap 60, kill bar 68 engages an outer, arcuate surface of safety catch 38, causing spring-loaded safety catch 38 to pivot downward under spring tension and allow kill bar 68 to slide below safety catch 38. During this process arm bar 74 may be conveniently positioned within slit 46.

FIG. 1-C shows an isometric view of rodent trap setting assembly 50 comprising the hand-held rodent trap setting device 10 and rodent trap 60 of FIG. 1-B with the rodent trap in an armed configuration, according to some embodiments of the present invention. As shown, an inner, convex surface of safety catch 38 engages kill bar 68 and prevents kill bar 68 from moving upward while a user safely secures arm bar 74 into the arm bar connector 64 of the trap bait station. Clamping arm 36 presses down on the platform of rodent trap 60, securing rodent trap 60 against the base of setting device 10 and preventing the motion/sliding of rodent trap 60 relative to the upper surface of setting device 10. As illustrated, clamping arm 36 presses down on the rodent trap platform in the limited area between kill bar 68 and the rear edge of the rodent trap platform. A linking assembly backstop 80 abuts against the rear of the rodent trap platform, preventing backward motion of rodent trap 60 once rodent trap 60 is aligned so that clamping arm 36 is aligned with the limited area between kill bar 68 and the rear edge of the rodent trap platform. Moving actuator 40 up and down under the control of a user's thumb/finger leads to rotation of the assembly comprising clamping arm 36 and backstop 80. In particular, the rotational motion has components including a vertical, up/down motion of clamping arm 36 that clamps/releases trap 60, and a longitudinal, front/back motion of backstop 80 that accommodates/pushes out rodent trap 60.

When trap 60 is to be secured within device 10, pressing up on actuator 40 moves backstop 80 rearward and clamping arm 36 downward. The resulting configuration is shown in FIG. 1-C and at 134 in FIG. 1-D. Conversely, after trap 60 has been set and a user wishes to release trap 60 from device 10, pressing down on actuator 40 moves backstop 80 forward and clamping arm 36 upward, which releases trap 60 and pushes it forward (via backstop 80), facilitating its placement at a desired location. The resulting configuration is shown at 136 in FIG. 1-D.

The angled shape of beveled front surface 16 further facilitates placing trap 60 on a flat surface such as a floor, by facilitating sliding device 10 from under trap 60 without dropping the set trap on the floor and/or triggering/snapping the trap.

As may be seen most easily in FIG. 1-A, clamping arm 36 and safety catch 38 are positioned off-center with respect to the central longitudinal (front-back) axis of device 10, and in particular to the right of center when looking forward from the rear to the front of device 10. Off-center placement provides room for the arm bar, and placement on the right side makes it easier to set trap 60. Some rodent traps have asymmetric connections between the arm bar and corresponding bait station connector. For such asymmetric designs, placing safety catch 38 on the right side of the central longitudinal axis of the trap makes the arm bar connection to the bait station easier to set than placing the safety catch on-center or on the other side of the central longitudinal axis. Off-center placement results in a small tilt of the kill bar, which is favorable for a commonly-used rodent trap design using a metal bait station.

FIG. 1-D shows isometric views of parts of linking assembly 44 of FIGS. 1-A-C according to some embodiments of the present invention. A clamped-down configuration is shown at 134, while a released configuration is shown at 136. A support 100 is mounted on base 12 (FIGS. 1-A-C) through a mount 110: mount 110 is affixed to base 12, and support 100 is in turn pivotably mounted on mount 110. Support 100 includes a body 106 mountable on mount 110, a frontal horizontal pivot 102 defined on a frontal extension 108 of body 106, and rear horizontal pivots 104*a-b*. Clamping arm 36 is mounted on frontal extension 108, for example using a threaded attachment. Safety catch 38 is pivotably mounted on pivot 102. At least safety catch 38 is spring loaded, so as to allow safety catch 38 to pivot downward when pressed upon by a trap kill bar, and snap back up after the kill bar has passed underneath safety catch 38. A lower/downward extension of body 106 defines backstop 80. Linking arm 130 and mount 110 are connected to rear pivots 104*a-b*, respectively. Linking arm 130 includes a front pivot 132*a* coupled to body 106 at pivot 104*a*, and a rear pivot 132*b* coupled to a pivot 122*a* of a rearward arm 120, to which actuator 40 is coupled. Rearward arm 120 further includes a pivot 122*b* coupled to mount 110. Linking assembly 44 may be made by modifying a toggle clamp to include the illustrated downward extension defining backstop 80.

FIGS. 2-A-B show isometric views of another hand-held rodent trap setting device 310 according to some embodiments of the present invention. Trap setting device 310 is similar to the device 10 shown in FIGS. 1-A-C, except that it has a different actuator and linking arm design for operating the clamping arm and/or safety catch, as described below. Trap setting device 310 includes a base 312 having a planar upper surface 314 configured to support a rodent trap 60, shown in FIG. 2-C. As shown in FIG. 2-A, base 312 has a beveled/angled front/distal surface 316, shaped to facilitate setting down the trap on the floor after arming, as described below. A rear/proximal surface 318 of base 312 faces the arm of an end user holding trap setting device 310 during its operation.

A handle 322 is attached to base 312 along the rear side of base 312, and extends generally downward and outward from base 312. A pair of lateral trap guides 324*a-b* are situated opposite each other along corresponding lateral sides of base 312.

A clamping arm assembly 332 is attached to base 312 along the rear side of base 312, and extends generally upward from base 312, above upper surface 314. Clamping arm assembly 332 includes a vertical clamping arm (clamping bar) 336 having a tip made of rubber or similar adherent and/or elastic material, configured to press down and secure the rodent trap platform between clamping arm 336 and base 312. Clamping arm assembly 332 further includes a spring-loaded kill bar safety catch 338 mounted on a horizontal pivot, configured to secure the rodent trap kill bar while the rodent trap is being set, as described in detail below. Clamping arm assembly 332 further includes a finger- and thumb-operated clamping arm actuator 340 extending downward through a transverse aperture 342 defined through base 312 and coupled through a horizontal pivot to base 312, and a thumb-operated clamping arm actuator 340' extending rearwardly from clamping arm 336. A linking assembly 344 comprises a plurality of linked parts, configured to convert a finger-actuated generally-longitudinal motion of actuator 340 and a thumb-actuated generally-longitudinal, downward motion of actuator 340' into corresponding vertical (downward and upward, respectively) motions of clamping arm 336 and safety catch 338. A generally-longitudinal slit/aperture 346 runs along a middle of handle 322, and extends partially along top surface 314 of base 312. Slit 346 accommodates a rodent trap arm bar during a process of setting the rodent trap.

FIG. 2-C shows an isometric view of rodent trap setting assembly 350 comprising the hand-held rodent trap setting device 310 and rodent trap 60 of FIG. 2-A-B with the rodent trap in an armed configuration, according to some embodiments of the present invention. As shown, a bait station 62 and corresponding arm bar connector 64 are mounted on a rodent trap base 66, alongside a kill bar 68 and corresponding arm bar 74. Kill bar 68 is mounted on platform 66 via a spring-loaded pivot 72. As kill bar 68 is lowered, under tension, onto the proximal (rear) side of trap 60, kill bar 68 engages an outer, arcuate surface of safety catch 338, causing safety catch 338 to pivot downward and allow kill bar 68 to slide below safety catch 338. During this process arm bar 74 may be conveniently positioned within slit 346 (shown in FIG. 2-A).

As shown in FIG. 2-C, an inner, convex surface of safety catch 338 engages kill bar 68 and prevents kill bar 68 from moving upward while a user safely secures arm bar 74 into the arm bar connector 64 of the trap bait station. Clamping arm 336 presses down on the platform of rodent trap 60, securing rodent trap 60 against the base of setting device 310 and preventing the motion/sliding of rodent trap 60 relative to the upper surface of setting device 310. As illustrated, clamping arm 336 presses down on the rodent trap platform in the limited area between kill bar 68 and the rear edge of the rodent trap platform. Actuator 340 abuts against the rear of the rodent trap platform, preventing backward motion of rodent trap 60 once rodent trap 60 is aligned so that clamping arm 336 is aligned with the limited area between kill bar 68 and the rear edge of the rodent trap platform. Moving actuator 340 up and down under the control of a user's thumb/finger leads to a rotational motion having longitudinal, front/back component that accommodates or pushes forward trap 60, as applicable. When trap 60 is to be secured within device 310, pulling actuator 340 backward with a user's fingers moves actuator 340 rearward and clamping arm 336 downward. Conversely, after trap 60 has been set and a user wishes to release trap 60 from device 310, pressing down with a user's thumb on actuator 340' moves actuator 340 forward and clamping arm 336 upward, which releases trap 60 and pushes it forward (via actuator 340), facilitating its placement at a desired location. The angled shape of beveled front surface 316 further facilitates placing trap 60 on a flat surface such as a floor, by facilitating sliding device 310 from under trap 60 without dropping the set trap on the floor.

FIG. 3-A shows an isometric view of a rodent trap assembly 450 comprising another hand-held rodent trap setting device 410 and rodent trap 60 in the process of setting rodent trap 60, according to some embodiments of the present invention. Trap setting device 410 is similar to the device 10 shown in FIGS. 1-A-C, except that it has a different actuator and linking arm design for operating the clamping arm and/or safety catch, as described below. Trap setting device 410 includes a base 412 having a planar upper surface 414 configured to support a rodent trap 60. Base 412 has a beveled/angled front/distal surface 416, shaped to facilitate setting down the trap on the floor after arming, as described below. A rear/proximal surface 418 of base 412 faces the arm of an end user holding trap setting device 410 during its operation.

A handle 422 is attached to base 412 along the rear side of base 412, and extends generally downward and outward from base 412. A pair of lateral trap guides 424*a*-*b* are situated opposite each other along corresponding lateral sides of base 412.

A clamping arm assembly 432 is attached to base 412 along the rear side of base 412, and extends generally upward from base 412, above upper surface 414. Clamping arm assembly 432 includes a vertical clamping arm 436 having a tip made of rubber or similar adherent and/or elastic material, configured to press down and secure the rodent trap platform between clamping arm 436 and base 412. Clamping arm assembly 432 further includes a kill bar safety catch 438 mounted on a horizontal pivot, configured to secure the rodent trap kill bar while the rodent trap is being set, as described in detail below. Clamping arm assembly 432 further includes a thumb-operated clamping arm actuator 440 extending rearward from base 412, and mounted on two horizontal pivots (see FIG. 3-E). A linking assembly 444 comprises a plurality of linked parts, configured to convert a thumb-actuated generally-vertical motion of actuator 440 into a vertical motion of clamping arm 436 and safety catch 438. A generally-longitudinal slit/aperture 446 runs along a middle of handle 422, and extends partially along top surface 414 of base 412. Slit 446 accommodates arm bar 74 during a process of setting the rodent trap. As kill bar 68 is lowered, under tension, onto the proximal (rear) side of trap 60, kill bar 68 engages an outer, arcuate surface of safety catch 438, causing safety catch 438 to pivot downward and allow kill bar 68 to slide below safety catch 438. During this process arm bar 74 may be conveniently positioned within slit 446.

FIG. 3-B shows an isometric view of rodent trap setting assembly 450 comprising the hand-held rodent trap setting device 410 and rodent trap 60 of FIG. 3-A with kill bar 68 in an armed configuration, and FIG. 3-C illustrates assembly 450 with arm bar 74 secured within its corresponding bait station connector, according to some embodiments of the present invention. An inner, convex surface of safety catch 438 engages kill bar 68 and prevents kill bar 68 from moving upward while a user safely secures arm bar 74 into the arm bar connector 64 of the trap bait station (as shown in FIG. 3-C). Clamping arm 436 presses down on the platform of rodent trap 60, securing rodent trap 60 against the base of setting device 410 and preventing the motion/sliding of rodent trap 60 relative to the upper surface of setting device 410. As illustrated, clamping arm 436 presses down on the rodent trap platform in the limited area between kill bar 68 and the rear edge of the rodent trap platform. A linking assembly backstop 480 abuts against the rear of the rodent trap platform, preventing backward motion of rodent trap 60 once rodent trap 60 is aligned so that clamping arm 436 is aligned with the limited area between kill bar 68 and the rear edge of the rodent trap platform. Moving actuator 440 up and down under the control of a user's thumb/finger leads to a longitudinal, front/back motion of backstop 480. When trap 60 is to be secured within device 10, pressing down on actuator 440 moves backstop 480 rearward and clamping arm 436 downward.

FIG. 3-D illustrates a release of trap 60 from device 410. After trap 60 has been set and a user wishes to release trap 60 from device 410, pressing up on actuator 440 moves backstop 480 forward and clamping arm 436 upward, which releases trap 60 and pushes it forward (via backstop 480), facilitating its placement at a desired location. The angled shape of beveled front surface 416 further facilitates placing trap 60 on a flat surface such as a floor, by facilitating sliding device 10 from under trap 60 without dropping the set trap on the floor.

FIGS. 3-E-F show clamping arm assembly 432 in closed and open configurations, respectively. Clamping arm assembly 432 comprises clamping arm 436, safety catch 438, actuator 440, and a linking assembly 444 connecting actuator 440 to clamping arm 436 and safety catch 438.

Linking assembly 444 comprises a support 500 coupled to base 412 (FIGS. 3-A-D) through a mount 510: mount 510 is affixed to base 412 (FIG. 3-D), and support 500 is in turn pivotably mounted on mount 510. Support 500 includes a body mountable on mount 510, a frontal horizontal pivot 502 on which safety catch 438 is mounted, and rear horizontal pivots 504*a*-*b* establishing rearward pivotable connections to actuator 440 and mount 510, respectively. A linking arm links rear pivots 506*a*-*b* to each other. Pivot 506*a* is coupled to actuator 440, and pivot 506*b* is coupled to mount 510*b*. In some embodiments, a safety catch such as 438 may be mounted directly on a clamping arm such as 436.

FIGS. 4-A shows an isometric view of mouse trap adapter 600 that can be used in conjunction with a rat trap setting device as shown in FIGS. 1-A-3-F according to some embodiments of the present invention. While the description below focuses on a mouse/rat trap pairing, the described structures may be used for devices/traps sized for other animals, one larger than the other. Mouse trap adapter 600 is sized generally as the platform of a rat trap (see e.g. trap 60), and has an internal longitudinal inner channel 602 sized to receive a mouse trap (see e.g. trap 660 in FIGS. 4-B-C). Mouse trap adapter 600 has outer lateral surfaces 620*a*-*b* spaced apart so as to fit within a rat trap setting device. Inner channel 602 has inner lateral surfaces 604*a*-*b* spaced laterally apart to fit the platform of a mouse trap within. The depth/height of inner channel 602 also matches the height of a corresponding mouse trap platform. A pair of mouse trap guides 624*a*-*b* extend inward from a top surface of the main body of adapter 600 across part of inner channel 602. Guides 624*a-b* serve to secure the mouse trap within channel 602. A beveled front surface 616 of adapter 600 facilitates placing the set mouse trap on a floor. A rear surface 618 of adapter 600 abuts rat trap setting device.

FIG. 4-B shows an isometric view of a mouse trap 660 disposed within the mouse trap adapter 600 of FIG. 4-A according to some embodiments of the present invention. As illustrated, guides 624*a-b* are disposed over the platform of mouse trap 660 when mouse trap 660 is slid within channel 602, constraining the vertical motion of mouse trap 660.

FIG. 4-C shows an isometric view of a mouse trap 660 disposed within the mouse trap adapter 600 of FIG. 4-A, which is in turn secured within a rat trap setting device 10 as shown in FIGS. 1-A-D according to some embodiments of the present invention. Such a mouse trap adapter may be used in conjunction with other rodent trap setting devices, such as the ones shown in FIGS. 2-3, for example. As shown in FIG. 4-C, lateral guides 24*a-b* enclose and secure mouse trap adapter 600 and its enclosed mouse trap 660 within trap setting device 100 while a user sets mouse trap 660. In particular, safety catch 38 slides over and secures the mouse trap kill bar, and clamping arm 36 presses onto the mouse trap platform, securing within device 10 the assembly formed by mouse trap 660 and adapter 600. After a user has set mouse trap 660, clamping arm 36 and safety catch 38 are released, and the resulting forward motion of the setting device backstop ejects the assembly formed by mouse trap 660 and adapter 600, which may then be placed onto the floor or other desired location. Mouse trap 660 may then be slid out of adapter 600 if adapter 600 is to be reused, or kept within adapter 600, as desired.

FIG. 5-A shows an isometric view of a rodent trap setting assembly 850 comprising another hand-held rodent trap setting device 810 and rodent trap 60 in an initial configuration, prior to the rodent trap arm being set, according to some embodiments of the present invention. Trap setting device 810 differs from the device 10 shown in FIGS. 1-A-C principally in that device 810 has a kill bar pulling arm and associated linking assembly, which may be implemented as described below using a pull clamp instead of a toggle clamp. Trap setting device 810 includes a base 812 having a planar upper surface 814 configured to support a rodent trap 60. Base 812 has a beveled/angled front/distal surface 816, shaped to facilitate setting down the trap on the floor after arming, as described below. A rear/proximal surface 818 of base 812 faces the arm of an end user holding trap setting device 810 during its operation.

A handle 822 is attached to base 812 along the rear side of base 812, and extends generally downward and outward from base 812. A pair of lateral trap guides 824*a-b* are situated opposite each other along corresponding lateral sides of base 812.

A pulling arm assembly 832 is attached to base 812 along the rear side of base 812, and extends generally upward from base 812, above upper surface 814. Pulling arm assembly 832 includes a pivotable pulling arm 834 mounted on a horizontal pivot and capable of pivoting in a vertical plane. Pulling arm 834 includes a frontal/distal hook/catch 838, configured to grab and pull the distal, transverse side of kill bar 68 as described below. In some embodiments, hook 838 is placed so that it grabs the transverse side of kill bar 68 slightly off-center (e.g. within one or a few mm of the center, more particularly within less than about half an inch from the center), to provide room at the center for the normal operation/setting of rodent trap 60. Pulling arm assembly 832 further includes a linking arm 844 mounted on base 812 and onto which pulling arm 834 is mounted. A frontal/distal end 840 of linking arm 844 may serve as an actuator, configured to be operated by a user's hand in a generally-longitudinal direction to move pulling arm 834 as illustrated below.

FIG. 5-B shows an isometric view of a rodent trap setting assembly 850 comprising the hand-held rodent trap setting device 810 and rodent trap 60 of FIG. 5-A with kill bar 68 in an intermediate configuration between initial and armed, and FIG. 5-C illustrates assembly 850 with kill bar 68 in an armed/spring-loaded configuration along the proximal end of rodent trap 60, according to some embodiments of the present invention. As shown in FIG. 5-B, an inner surface of hook/catch 838 engages kill bar 68, and pulls kill bar 68 rearward toward an armed position in response to a user pulling linking arm 844 rearward. A linking assembly backstop 880 abuts against the rear of the rodent trap platform, preventing backward motion of rodent trap 60 once rodent trap 60 is aligned so that pulling arm 834 is aligned with kill bar 68. An exemplary resulting armed configuration is shown in FIG. 5-C.

As shown in FIG. 5-C, in an armed configuration, pulling arm 834 holds kill bar 68 back in a tensioned, set configuration. Lateral guides 824*a-b* hold down the trap platform, exerting a counter-torque that prevents the upward rotation of the distal end of rodent trap 60 in response to the downward force exerted by pulling arm 834 at the proximal end of rodent trap 60. Rodent trap 60 is thus pressed against the base of setting device 810, preventing the motion/sliding of rodent trap 60 relative to the upper surface of setting device 810. A backstop 880' prevents the rearward motion of rodent trap 60.

A clamping arm 836 is rigidly coupled to, and preferably integrally formed with, pulling arm 834. Clamping arm 836 extends generally vertically downward when pulling arm 834 is in a generally-horizontal orientation. When pulling arm 834 is in retracted position as illustrated in FIG. 5-C, clamping arm 836 contacts and presses down on the platform of rodent trap 60, securing rodent trap 60 in place against the base of device 810. Clamping arm 836 may include a terminal rubber or polymer tip, as described above.

FIG. 5-D illustrates another rodent trap setting assembly 850' in an armed configuration, according to some embodiments of the present invention. A rodent trap setting device 810' includes an additional safety catch 838', which secures kill bar 68 after hook 838 brings down kill bar 68 into an armed position, and an associated clamping arm 836' used to clamp down the rodent trap. A toggle clamp assembly 844' as described above with reference to FIGS. 1-A-D is used to operate clamping arm 836' and release safety catch 838' when rodent trap 60 is to be set down.

FIG. 5-E shows an exploded view of various parts of pulling arm assembly 832 according to some embodiments of the present invention. Pulling arm assembly 832 comprises pulling arm 834, linking arm 844, and a mount 810. A number of pins 825, 835, 845, are provided as separate parts (825, 845) or integrated into one of the other parts (835). Each pin engages a matching aperture to creates a pivot joint as illustrated. In particular, linking arm 844 includes matching pairs of proximal, intermediate and distal apertures defined along two parallel plates. The proximal apertures receive pin 845 to pivotably couple to mount 810. The distal apertures receive pin 825 to stabilize linking arm 844, particularly in the presence of force applied by a user's hand to the distal part of linking arm 844. The intermediate aperture receives pin 835, providing a pivotable connection to pulling arm 834 and its associated hook/catch 838.

Connecting the pulling arm at an intermediate location along the lever formed by the linking arm allows reducing the force needed to be applied by a user to generate a given force on the rodent trap kill bar. Since at equilibrium the torque applied by the kill bar to the linking arm at the intermediate location is equal to the torque applied by the user's hand (or driving device such as motor) at the distal end, the ratio of the forces is determined by the ratio of the two lever arm lengths, which yields a lower force (and longer lever arm) at the distal end where the user applies force.

FIG. 6-A shows an isometric view of a flat hand-held rodent trap setting device 910, FIG. 6-B shows an isometric view of an assembly 950 including trap setting device 910 holding rodent trap 60 while rodent trap 60 is being armed, and FIG. 6-C shows an isometric view of trap setting device 910 holding rodent trap 60 in a set configuration, according to some embodiments of the present invention. Device 910 has a scoop configuration, as distinguished from the gun configuration described above.

Compared to the device 10 shown in FIGS. 1-A-C, trap setting device 910 has a horizontal handle that renders the underside of the device flat/planar and more amenable to storage/display on flat surfaces such as shelves, while allowing users to handle/operate the device with two hands. Trap setting device 910 includes a base 912 having a planar upper surface 914 configured to support a rodent trap 60, shown in FIGS. 6-B-C. A planar lower surface is disposed below planar upper surface 914 in a parallel relationship to planar upper surface 914, and is suitable for supporting device 910 in a horizontal position and/or for stacking multiple devices, as described below. As shown in FIG. 6-A, base 912 has a beveled/angled front/distal surface 916, shaped to facilitate setting down the trap on the floor after arming, as described below. A rear/proximal surface 918 of base 912 faces the arm of an end user holding trap setting device 910 during its operation.

A horizontal handle 922 is attached to base 912 along the rear side of base 912, and extends generally horizontally rearward and outward from base 912. A generally-longitudinal slit/aperture 946 runs along a middle of handle 922, and extends partially along top surface 914 of base 912. Slit 946 accommodates a rodent trap arm bar during a process of setting the rodent trap. A pair of lateral trap guides 924a-b are situated opposite each other along corresponding lateral sides of base 912.

A clamping arm assembly 932 is attached to base 912 along the rear side of base 912, and extends generally upward from base 912, above upper surface 914. Clamping arm assembly 932 is similar to the clamping arm assemblies described above, for example clamping arm assemblies 32 described with reference to FIGS. 1-A-D, or clamping arm assembly 332 described with reference to FIGS. 2-A-C. As a skilled artisan would appreciate, other clamping arm assembly designs, including as described above, may be used with a generally-flat, paddle-shape design as shown in FIG. 6-A-C.

FIG. 7 shows an isometric view of another scoop assembly 1050 comprising rodent trap 60 and a flat hand-held rodent trap setting device 1010 with an elongated handle 1022 and a clamping arm assembly 1032 comprising elongated rearward arm 1020, according to some embodiments of the present invention. Rearward arm 1020 supports/includes an actuator 1040. Rearward arm 1020 has a length (longitudinal extent) on the order of inches, for example 2-6 inches, more particularly about 4 inches, so that actuator 1040 is situated behind the rear face of rodent trap 60 at a similar distance (e.g. 2-6 inches, more particularly about 4 inches). The illustrated embodiment facilitates the placement of rodent trap 60 in places that may otherwise be difficult to access, such as behind or under furniture or other obstacles, or in locations where a user's access is otherwise obstructed. A long handle 922 facilitates placing rodent trap 60 in such remote/obstructed locations, while a rearwardly-displaced actuator 1040 facilitates releasing rodent trap 60 while rodent trap 60 is situated relatively close to its eventual placement location, thus reducing the time and/or movement of rodent trap 60 between the location of its release from trap setting device 1010 and the location of its eventual placement. In a preferred embodiment, the front of assembly 1050 is placed on the floor at the desired placement location, for example against a wall, and the clamping arm and safety catch are released with the assembly held fixed in place. Rodent trap 60 is then allowed to slide down onto the floor by gently sliding trap-setting device 1010 out. The above procedure reduces the chance of inadvertent triggering of rodent trap 60, for example if the clamping arm is released before rodent trap 60 touches the floor and the front side of rodent trap 60 then falls down to the floor.

FIG. 8 shows an isometric view of another scoop assembly 1150 comprising rodent trap 60 and a flat hand-held rodent trap setting device 1110 according to some embodiments of the present invention. Device 1110 has a long flat handle 1122 as described above. A clamping arm assembly 1132 includes an elongated rearward arm 1120 that supports/includes an actuator 1140 configured to allow a user to press arm 1120 downward/upward. A secondary actuator 1140' is positioned along a front arm 1160 of clamping arm assembly 1132.

FIGS. 9-A-B show isometric views of another scoop assembly 1250 comprising a flat hand-held rodent trap setting device 1210 holding rodent trap 60, according to some embodiments of the present invention. Device 1210 has a long flat handle 1222 as described above. A clamping arm assembly 1232 includes upper and lower elongated rearward arms 1220, 1220' that support/include corresponding upper and lower actuators 1240, 1240' configured to allow a user to press arms 1220, 1220' downward/upward.

FIG. 9-C shows isometric views of parts of a linking assembly 1244 suitable for use with the device 1110 of FIG. 8, along with a lower arm 1220' as described with reference to FIGS. 9-A-B, according to some embodiments of the present invention. Linking assembly 1244 includes upper and lower rearward arms 1220, 1220'. Lower rearward arm 1220' includes an actuator 1240' configured to allow a user to push linking assembly 1244 upward/downward. A mount 1211 is affixed to a base of device 1210. Mount 1211 includes a pivot aperture 1212. Pivot aperture 1212 is coupled to corresponding rear pivots of pairs of protruding/recessed pivots 1222, 1242, 1162 defined in arms 1220, 1220', 1160, respectively. A linking arm 1230 is coupled to corresponding front pivots of the pairs of protruding/recessed pivots 1222, 1242, 1162. Linking arm 1230 cooperates with arms 1220, 1220', 1160 and a clamping arm support 1200 to convert the up/down motion of arms 1220, 1220', 1160 into up/down clamping/release motions of the corresponding clamping arm of clamping arm assembles 1132, 1232.

FIGS. 10-A-C show isometric views of an assembly 1350 including a flat hand-held rodent trap setting device 1310 with an elongated handle 1322 and remote/extended actuator 1340 according to some embodiments of the present invention. A clamping arm assembly 1332 includes a linking arm 1380 having a generally-longitudinal channel 1382 sized to receive an inner protrusion coupled to actuator 1340 so that a rotational motion of actuator 1340 is converted to a vertical motion of the end of linking arm 1380 that causes a clamping and release of a clamping arm of clamping arm assembly 1332. A front of linking arm 1380 is coupled indirectly to the clamping arm, as illustrated at 1390. Actuator 1340 is coupled to, for example mounted on or integrally formed with, a rotary actuator support 1384. Actuator support 1384 is mounted on an axle 1386 that passes through a traverse aperture defined through handle 1322. The transverse aperture defines a transverse rotational axis for actuator support 1384 and actuator 1340. In the illustrated embodiment, actuator support 1384 is a thin disc, having a generally-longitudinal major plane disposed next to a lateral surface of handle 1322.

FIG. 10-D-E show isometric views of parts of clamping arm assembly 1332, including linking arm 1380 and actuator support 1384. As illustrated, the front of linking arm 1380 includes two longitudinally-spaced transverse protrusion, illustrated at 1390, configured to engage matching apertures defined in a support and linking arm of the clamping arm assembly. A transverse central aperture 1388 defined in actuator support 1384 is sized to accommodate axle 1386.

FIGS. 11-A-B show isometric views of another assembly 1550 including a flat hand-held rodent trap setting device 1510 with remote/extended setting actuators 1540, 1540' according to some embodiments of the present invention. A clamping arm assembly 1532 includes a linking arm 1580 coupled to a rotary actuator support 1584 through a transverse extension 1541 sized to fit through a longitudinal channel defined in linking arm 1580. Actuators 1540, 1540' extend transversely from actuator support 1584. Actuator support 1584 is mounted on a handle 1522 via an axle 1586. Actuator support 1584 is disposed within a central longitudinal gap 1546 defined through handle 1522. Actuator 1540, situated above handle 1522, is configured to be pulled by a user's thumb to arm/secure the trap, while actuator 1540', situated below handle 1522, is configured to be pulled by a user's finger(s) to release the device clamping arm.

FIGS. 12-A-B show isometric views of another assembly 1650 including a flat hand-held rodent trap setting device 1610 with remote/extended setting actuators 1640, 1640' according to some embodiments of the present invention. A rotary actuator support 1684 is mounted on a handle 1622 via an axle 1686. A longitudinal linking arm 1680 has a longitudinal channel 1682 accommodating a transverse extension 1641 extending from actuator support 1684. FIG. 12-C shows an isometric view of rotary actuator support 1684 according to some embodiments of the present invention. Actuator 1640, situated above handle 1622, is configured to be pulled by a user's thumb to arm/secure the trap, while actuator 1640', situated below handle 1622, is configured to be pulled by a user's finger(s) to release the device clamping arm.

FIGS. 13-A-B show isometric views of another assembly 1750 including a flat hand-held rodent trap setting device 1710 with remote/extended setting actuators 1740, 1740' according to some embodiments of the present invention. FIG. 13-A shows device 1710 in a released configuration, while FIG. 13-B shows assembly 1750 in a clamped-down, set configuration. A clamping arm assembly 1732 includes a rotary actuator support 1784 mounted on a handle 1722. A longitudinal linking arm 1780 is coupled to actuator support 1784 through a transverse pivot 1741. FIG. 13-C shows an isometric view of rotary actuator support 1784, linking arm 1780 and a frontal clamping arm subassembly 1785 according to some embodiments of the present invention. Pushing linking arm 1780 forward clamps down rodent trap 60 in place, as shown in FIG. 13-B, while pulling linking arm 1780 releases rodent trap 60. The conversion of the rotary motion of actuator support 1784 into longitudinal motion of linking arm 1780 and vertical motion of the clamping arm is achieved by connecting linking arm 1780 via front and rear pivots to actuator support 1784 and front subassembly 1785, respectively.

Figures 14, 15, 16:
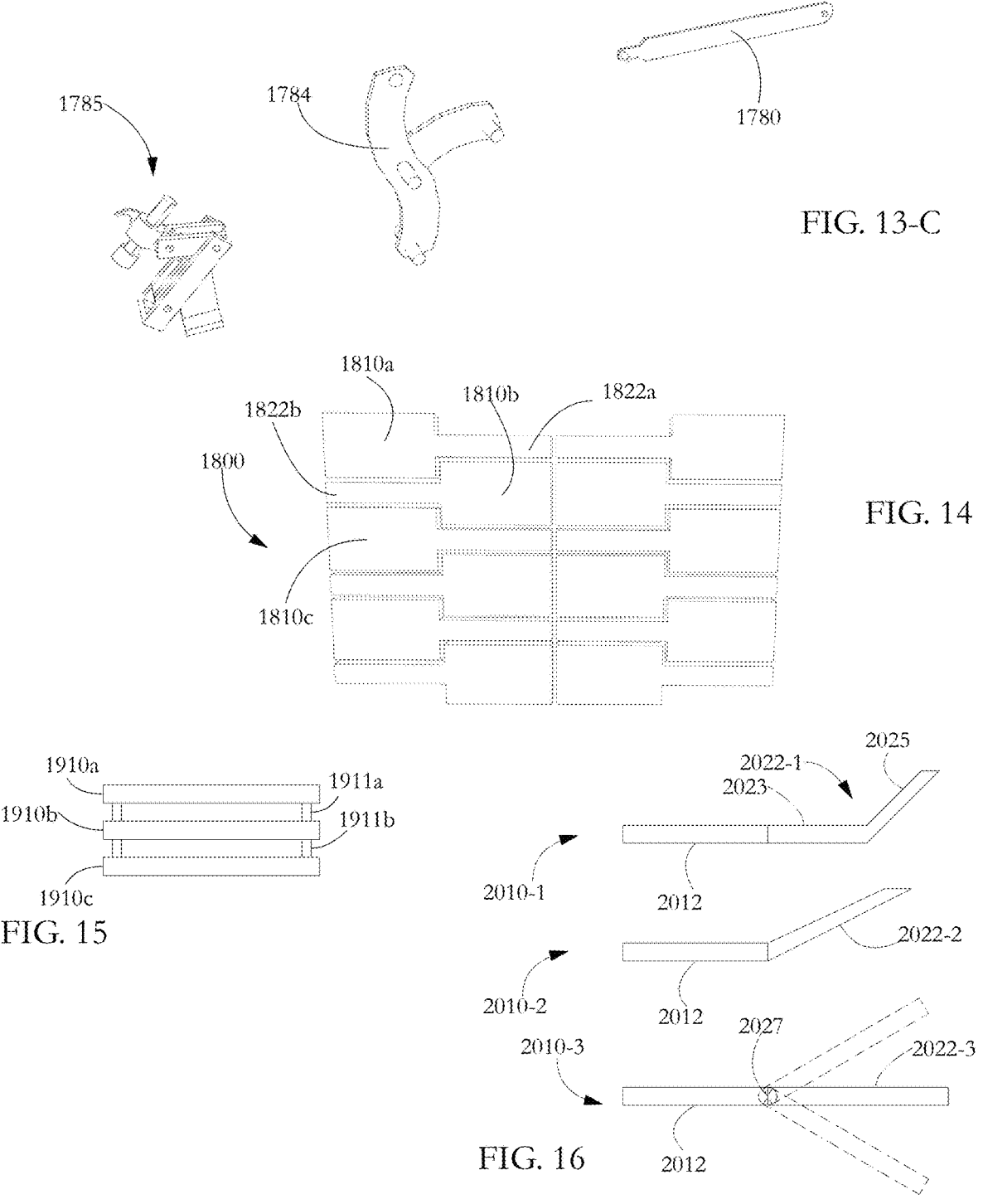
FIG. 14 illustrates an approach to horizontal interposition of hand-held rodent trap setting devices according to some embodiments of the present invention.
FIG. 15 illustrates an approach to vertical stacking of hand-held rodent trap setting devices according to some embodiments of the present invention.
FIG. 16 shows side views of hand-held rodent trap setting devices illustrating different handle geometry/positioning approaches according to some embodiments of the present invention.

FIGS. 14, 15 illustrate approaches to horizontal interposition and vertical stacking, respectively, of hand-held rodent trap setting devices according to some embodiments of the present invention. Horizontal interposition and vertical stacking may be useful for transportation, packaging, storage and/or retail display of such devices. FIG. 14 shows a plurality of rodent trap setting devices 1810a-c in a transverse view, e.g. from the top/bottom. As shown, adjacent devices are oriented in opposite longitudinal directions, with a handle 1822a of device 1810 disposed next to the base of an adjacent device 1810b, and opposite the handle 1822b of device 1810b, to facilitate the horizontal stacking of multiple devices. FIG. 15 shows a plurality of rodent trap devices 1910a-c in a side view, i.e. perpendicular to the view of FIG. 14. A plurality of removable transverse stacking pins 1911a-b engage corresponding apertures defined in devices 19a-c, to support multiple devices in a horizontal position so as to facilitate the vertical stacking of multiple devices.

FIG. 16 shows side views of hand-held rodent trap setting devices 2010-1-3 illustrating different handle geometry/positioning approaches according to some embodiments of the present invention. A device 2010-1 includes a base 2012, and a handle 2022-1 connected to base 2012 as described above. Handle 2022-1 includes a horizontal member 2023 connected to base 2012, and an upward member 2025 fixedly connected to or integrally formed with horizontal member 2023 and extending generally above the major plane of base 2012 (the horizontal plane). The angle between member 2025 may have different values between 0 and 90 degrees, and may be for example between 30 and 60 degrees. A device 2010-2 includes base 2012 and a straight handle 2022-2 connected to base 2012 and extending upward at an angle. A device 2010-3 includes base 2012 and a pivotable straight handle 2022-3 connected to base 2012 through a transverse pivot 2027. Dashed lines illustrate different positions of handle 2022-3 as it pivots. Pivot 2027 may have pivotable and fixed configurations set by a user, depending on whether the user wishes to adjust the angle of handle 2022-3 or use handle 2022-3 in a fixed position.

Figure 17:
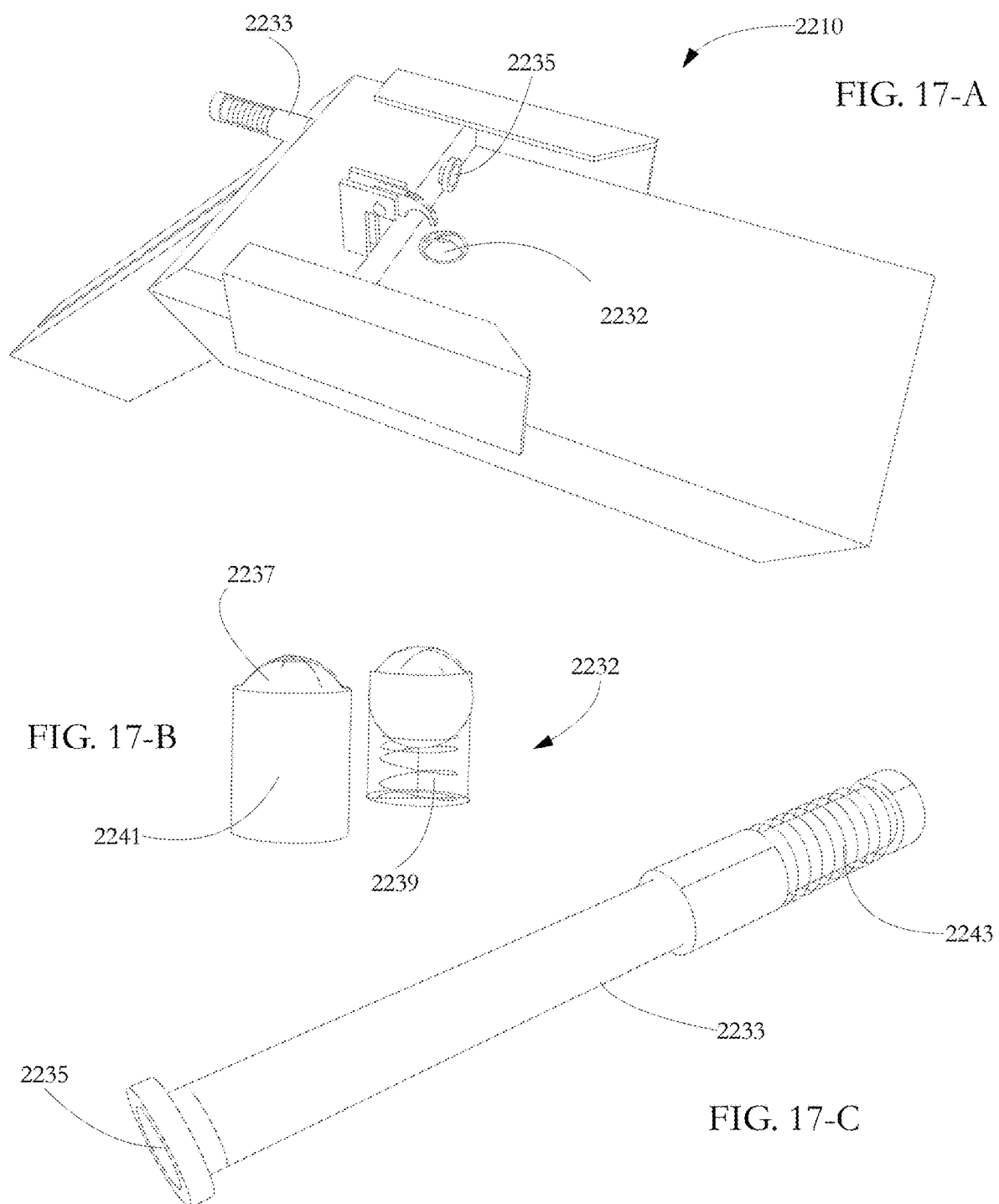
FIG. 17-A shows an exemplary rodent trap setting device having a ball-shaped, spring-loaded retainer and a release/ejection actuator for releasing/ejecting the rodent trap according to some embodiments of the present invention.

FIG. 17-A shows an exemplary rodent trap setting device 2210 having a ball-shaped, spring-loaded retainer 2232 and a release/ejection actuator 2233 for releasing/ejecting the rodent trap, according to some embodiments of the present invention. Release actuator 2233 comprises a spring-loaded plunger/rod extending through a rear wall of trap setting device 2210. Release actuator 2235 includes a proximal flat contact surface 2235 configured to contact and push a side wall of a rodent trap platform outward to disengage the rodent trap from trap setting device 2210. During insertion, the rodent trap is slid into place, which automatically depresses spring-loaded retainer 2232 and causes spring-loaded retainer to press upward on the bottom surface of the rodent trap platform, securing the rodent trap in place. To release/eject the rodent trap, a user pushes the rear end of release actuator 2233, which causes the rodent trap to be pushed forward so as to clear spring-loaded retainer 2232, thus allowing the rodent trap to be slid to a delivery location by tilting device 2210, as described above.

In some embodiments, more than one spring loaded-retainer may be used along the base of device 2210 or in other positions. In some embodiments, one or more spring-loaded retainers may be disposed laterally, so as to press on one or both opposite side surface(s) of the rodent trap platform. In some embodiments, one or more spring-loaded retainers may also be disposed above the rodent trap platform, for example within the upper sides of device lateral guides, so as to press the rodent trap platform from above.

In some embodiments, one or more spring clips may be used as spring-loaded retainers. A spring clip may be formed by an arcuate strip of flexible metal, disposed in a corresponding longitudinal channel. For example, opposing spring clips may be disposed on opposite lateral sides of rodent trap platform. For such a spring clip, the outer surface is curved/arcuate in the longitudinal (insertion) direction, and flat/linear in the transverse direction.

FIG. 17-B shows spring-loaded retainer 2232 according to some embodiments of the present invention. A ball-shaped member 2237 having a curved upper surface is movable vertically within a cylindrical housing 2241, and supported by a spring 2239. The curved upper surface converts a horizontal force applied by the rodent trap platform into a vertical force applied to spring 2239, pressing down ball-shaped member 2237 as the rodent trap platform is slid horizontally in place within device 2210.

FIG. 17-C shows release/ejection rod 2233 according to some embodiments of the present invention. A spring 2243 provides a spring loading between an inner member of release rod 2233 and an outer housing of release rod 2233, allowing a longitudinal (forward/back) motion of contact surface 2235 as the outer housing remains in a fixed position relative to the base and rear wall of device 2210.

Figure 18:
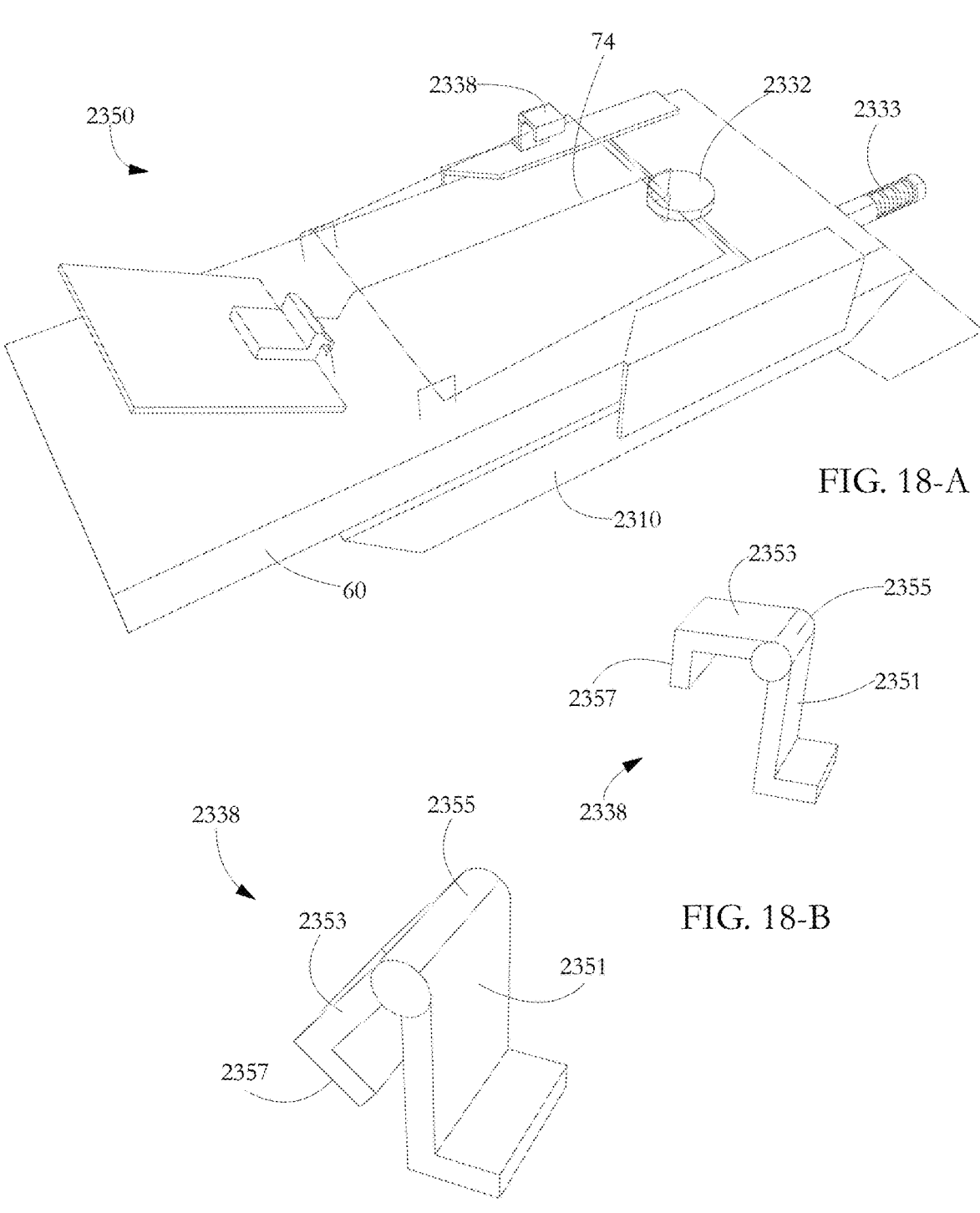
FIG. 18-A shows an exemplary rodent trap setting device having a magnetic retainer positioned to attach to a rodent trap arm bar hinge/attachment according to some embodiments of the present invention.

FIG. 18-A shows an exemplary assembly 2350 including a rodent trap setting device 2310 having a magnetic retainer 2332 positioned to attach to a rodent trap arm bar hinge/attachment according to some embodiments of the present invention. Retainer 2332 is a disk-shaped, generally-horizontal permanent magnet disposed along the rear of the base of device 2310, so as to engage an arm bar structure (assembly) of trap 60. The arm bar structure includes arm bar 74, and a hinge/attachment connecting arm bar 74 to the base of trap 60. The arm bar structure is commonly made of a ferromagnetic material such as steel, and thus is magnetically attracted to retainer 2332. A release actuator 2333 is configured to push outward (forward) a side wall of trap 60 to disengage trap 60 from retainer 2332, thus allow sliding trap 60 out of trap setting device 2310 at a deployment location.

A spring-loaded safety catch 2338 is positioned along a side of device 2310, for example on the top surface of a lateral guide of device 2310. FIG. 18-B shows spring-loaded safety catch 2338 in compressed and engaged positions, according to some embodiments of the present invention. Safety catch 2338 includes a vertical member 2351, a rotatable member 2353 connected to vertical member 2351 through a spring-loaded hinge 2355, and a lateral member 2357 extending down from the side of rotatable member 2353 opposite hinge 2355. In a compressed position, resulting from the kill bar pressing down on safety catch 2338, rotatable member 2353 forms an acute angle relative to vertical member 2351, allowing the trap kill bar to slide downward past rotatable member 2353. In an engaged position, resulting after passage of the kill bar downward, rotatable member 2353 is generally horizontal, i.e. perpendicular to vertical member 2351. The lateral positioning of safety catch 2338, with a longitudinal channel accommodating a side part of the kill bar, allows sliding out trap 60 underneath safety catch 2388 without depressing or otherwise changing the position of safety catch 2338 from its engaged position, in which safety catch 2338 prevents the kill bar from snapping.

Figures 19, 20:
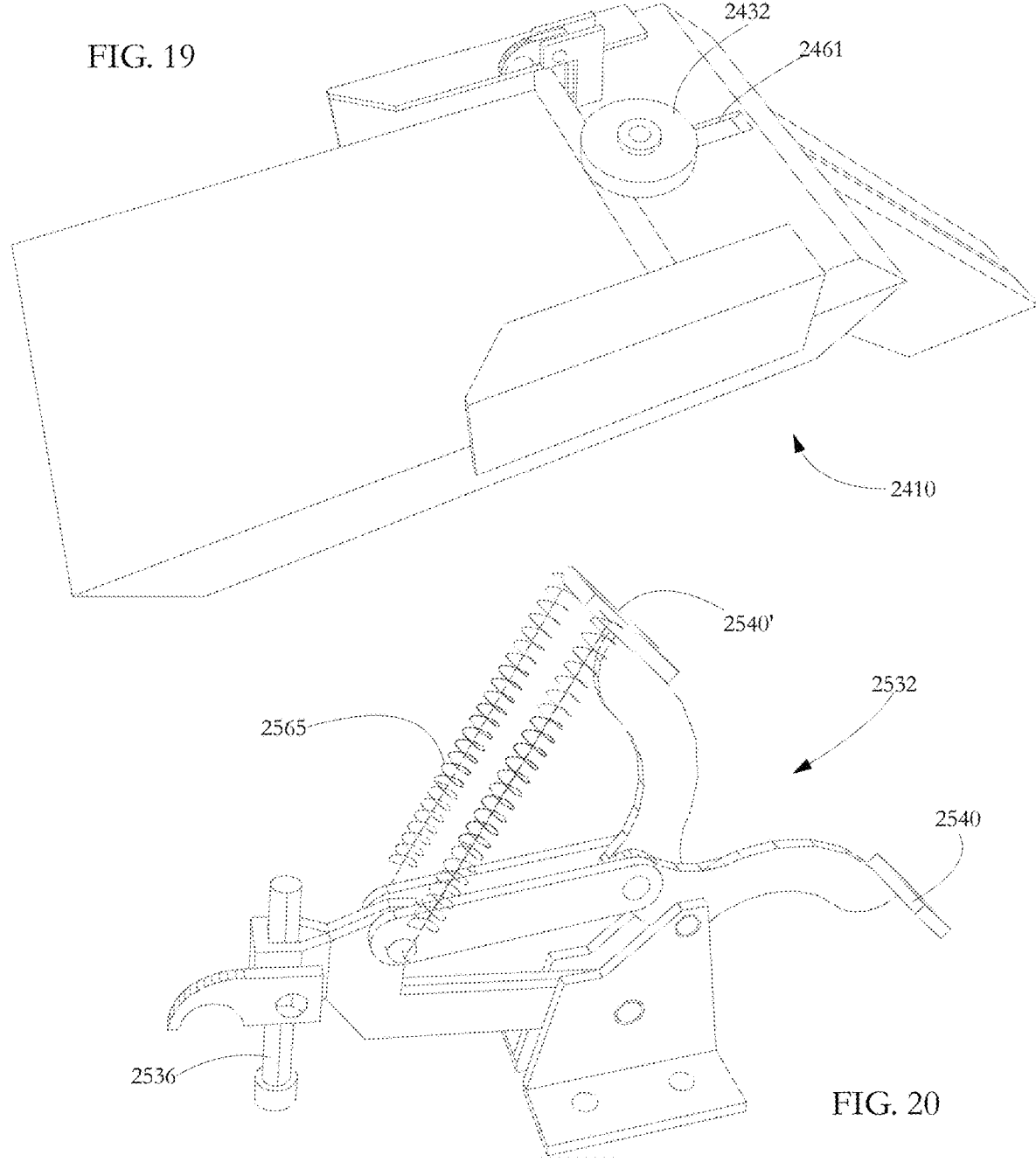
FIG. 19 shows a rodent trap setting device having a longitudinally-slidable magnetic retainer according to some embodiments of the present invention.
FIG. 20 shows a rodent trap retainer having a spring-loaded actuator according to some embodiments of the present invention.

FIG. 19 shows a rodent trap setting device 2410 having a longitudinally-slidable magnetic retainer 2432 according to some embodiments of the present invention. Retainer 2432 is formed by a disk-shaped, generally-horizontal permanent magnet that is longitudinally-retractable relative to a base of device 2410, along a longitudinal aperture 2461 accommodating a vertical support rod that supports the magnet. Retracting the magnet rearward allows releasing the rodent trap from device 2410, while pushing the magnet forward allows engaging the arm bar structure of the rodent trap to secure the rodent trap to the base.

FIG. 20 shows a rodent trap retainer formed by a clamping arm assembly 2532 having spring-loaded actuators 2540, 2540' according to some embodiments of the present invention. A clamping arm 2536 is coupled to actuators 2540, 2540', which are spring-loaded via a spring 2565 that automatically returns clamping arm 2536 to an engaged (compressed) position when a user releases/removes a downward force applied to actuator 2540. The configuration of FIG. 20 simplifies the operation of a clamping arm assembly by requiring only one downward actuation and release in order to insert or remove a rodent trap, as distinct from two distinct actuations, one for engaging the clamping arm and a separate one for releasing the clamping arm.

Figure 21:
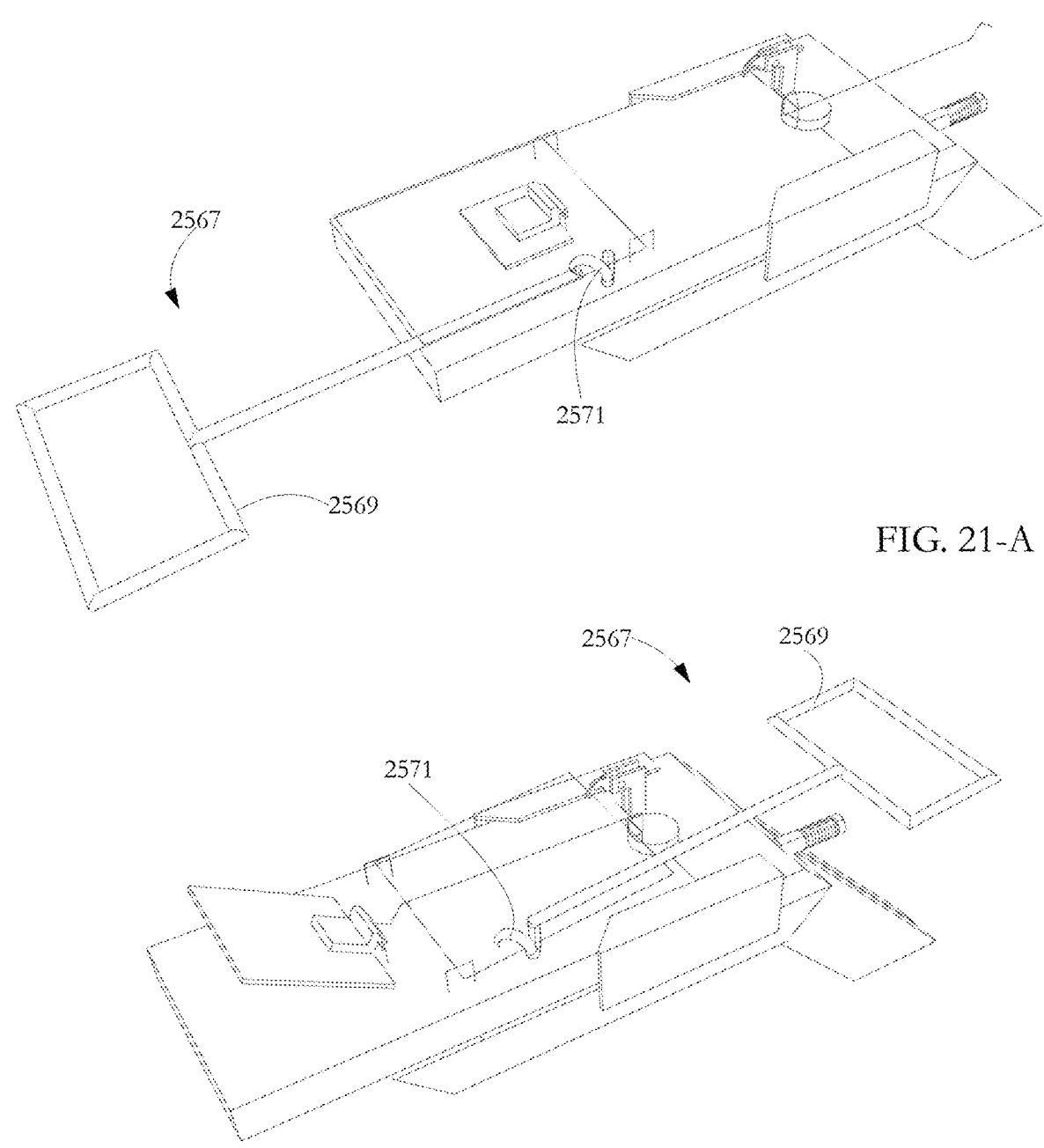
FIG. 21-A shows a rodent trap arming tool in an initial position according to some embodiments of the present invention.

In some embodiments, an arming tool may be used to apply torque to the rodent trap kill bar in a leveraged manner, in order to reduce the force applied by a human hand in order to arm the kill bar. FIG. 21-A shows a rodent trap arming tool 2567 in an initial position according to some embodiments of the present invention, while FIG. 21-B shows rodent trap arming tool 2567 in an armed position according to some embodiments of the present invention. Arming tool 2567 includes a handle 2569 connected to a rod having a corkscrew-shaped (helical) distal hook 2571 configured to slide around a side part of the rodent trap kill bar. A user threads the distal hook 2571 around a side part of the kill bar, and then uses arming tool 2567 as an extension lever, with the arming tool applying force to the cross part of the kill bar, to arm the kill bar into the armed position shown in FIG. 21-B. Such an arming tool may be particularly helpful to users with weaker hands, for whom unaided arming of the kill bar is particularly difficult.

Figure 22:
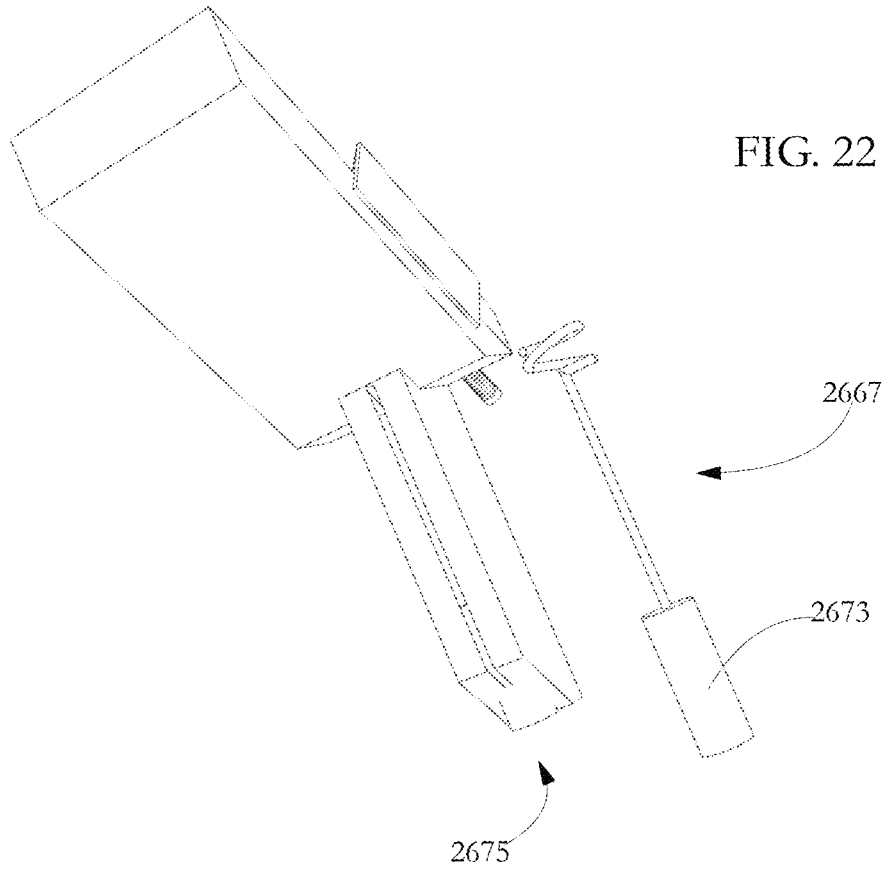
FIG. 22 shows a tubular rodent trap arming tool configured to be stored/carried inside a handle of a rodent trap setting device according to some embodiments of the present invention.

FIG. 22 shows a tubular rodent trap arming tool 2667 configured to be stored/carried inside a handle of a rodent trap setting device according to some embodiments of the present invention. Arming tool 2667 has a tubular handle 2673, which is sized to fit inside a longitudinal aperture defined in a setting device handle, as illustrated at 2675 in FIG. 22.

Figure 23:
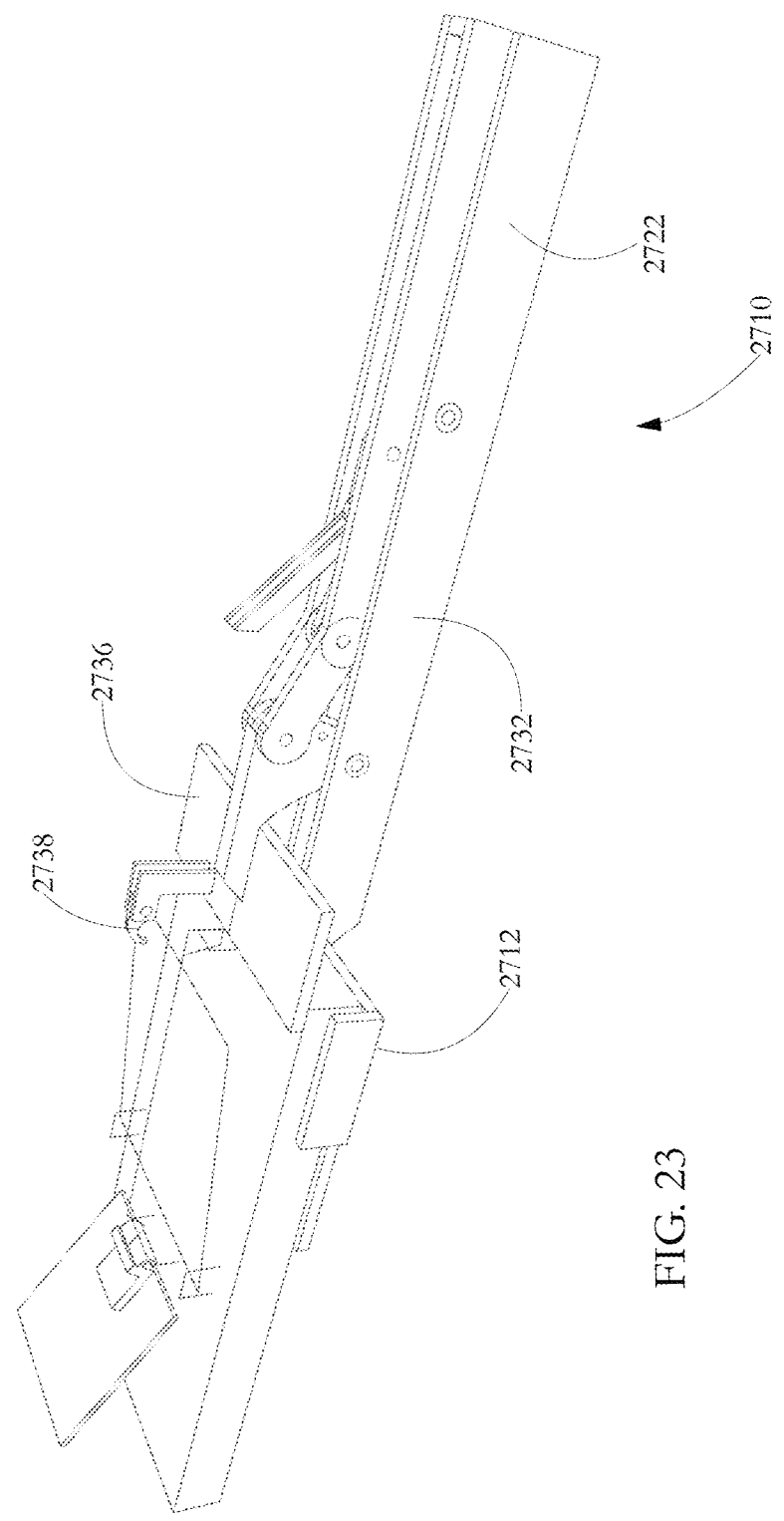
FIG. 23 shows an exemplary rodent trap setting plier device according to some embodiments of the present invention.

FIG. 23 shows an exemplary rodent trap setting plier device 2732 according to some embodiments of the present invention. A base 2712 receives a distal end of a rodent trap platform, while a top plate 2736 clamps down the distal end of the rodent trap platform onto base 2712 under the control of a plier assembly 2732 coupled to a handle 2722. A safety catch 2738 is mounted on an upper surface of top plate 2736. Plier device 2732 secures the rodent trap to base 2712, to facilitate arming the rodent trap as described above.

A skilled artisan will be able to ascertain suitable dimensions for the various components described above, for desired applications. As an example, a popular rat trap design has a platform approximately 6$^{15}$/₁₆" long by 3⅜"

wide, and a similar mouse trap design has a platform approximately $3^{15}\!/_{16}$" by $1^3\!/_4$" wide. For such an application, a suitable rat trap setting device base may have slightly larger dimensions, for example approximately 7" by $3^1\!/_2$". For a $5\!/_8$" rat trap platform thickness, suitable lateral guide dimensions (24*a*-*b* in FIG. 1-A) may be $1^3\!/_8$" for the vertical sides (26*a*-*b*) and $3\!/_8$" for the horizontal covers (30*a*-*b*). The thickness and width of handle 22 may be on the order 1" to $1^1\!/_2$", for example about $1^1\!/_4$", with gap 22 having a width of about $1\!/_4$". The longitudinal distance between the backstop (80) and safety catch (38) and clamping arm (36) is chosen so that when the rodent trap rests against the backstop, the safety catch secures the trap kill bar in an armed position and the clamping arm fits in the space on the trap platform behind the kill bar, as illustrated in FIG. 1-C. The height of the safety catch (38) in a clamped position may be approximately 1", for example about $7\!/_8$", above the rodent trap platform, which stops the kill bar about $1\!/_4$" above the ultimate set position in which the kill bar is secured by the arm bar. An exemplary longitudinal distance between the backstop and center of the arm bar is approximately $1\!/_4$". An exemplary longitudinal distance between the backstop and the location where the kill bar is held by the safety catch is about $5\!/_8$". In embodiments using an elongated horizontal (scoop-style) handle and/or elongated rearward linking arm assembly, suitable in particular for facilitating the placement of rodent traps in relatively inaccessible locations, an elongated handle may have a length (longitudinal extent) of 8 to 30 inches, for example 10 to 20 inches, more particularly about 12-15 inches. For example, in an exemplary embodiment as illustrated in FIG. 10-A, a part of the handle behind actuator support 1384 may have a length of about 5 to 10 inches, the diameter of actuator support 1384 is about 3 inches, and linking arm 1380 has a length of about 3 to 8 inches, leading to a total length of 11 to 21 inches.

In some embodiments, multiple mounting apertures for the retainer (e.g. clamping arm assembly) may be provided on a trap setting device base, with each mounting aperture position corresponding to a different manufacturer's rodent trap design dimensions, so as to provide proper alignment of the safety catch, retainer and kill bar for multiple potential rodent trap designs/dimensions. In some embodiments, such mounting apertures may be provided in an orthogonal (x-y) array allowing flexible placement of the retainer at many locations along the device, so as to accommodate multiple and potentially unknown rodent trap dimensional configurations.

As noted above, in some embodiments the resting vertical position (height) and the vertical excursion of the rodent trap retainer (e.g. clamping arm) is vertically adjustable so as to match a rodent trap of a given thickness. For example, the retainer excursion range is moved downward to accommodate a thinner rodent trap platform, and upward to accommodate a thicker rodent trap platform. The vertical adjustment may be achieved via a threaded or other vertically-adjustable retainer support.

A skilled artisan will be able to ascertain suitable materials for the various components described above, for desired applications. Since the clamping arm, safety catch, spring and linking mechanisms for clamping the rodent trap and securing the kill bar may be subject to significant and repeated forces, it may be desirable to use relatively strong materials for the components, for example a metal such as steel. A soft and adhesive material such as rubber may be used for the clamping arm tip. Other components, such as the handle, base, lateral guides, and adapter, may be made of softer materials. In some embodiments, the lateral guides, handle, base and adapter may be made of plastics/polymers, wood and/or aluminum.

Trap-setting devices as described above may be made by first assembling or otherwise manufacturing (e.g. via injection molding or other suitable technique) the device base and handle, and then mounting a clamping arm assembly and/or actuator onto the base. The mounting may be achieved via adhesive and/or one or more fasteners (e.g. screws). The proper alignment of the clamping arm assembly may be tested and/or adjusted prior to finalizing the device, to ensure proper alignment of the clamping arm and safety catch with the rear space on a rodent trap platform and the corresponding kill bar, respectively. In some embodiments, matching depressions and/or raised structures in the base and clamping arm assembly mount may be used to facilitate alignment of the clamping arm in a precisely-defined location along the base. For example, a shallow channel matching the shape of the mount may be defined along the top surface of the base, so that the clamping arm assembly mount fits precisely within the channel. Other examples of depressions and raised structures include longitudinal channels and corresponding rails, and round apertures and corresponding protrusions.

Exemplary rodent trap-setting devices as described above allow end users, particularly users with frail hands and/or poor vision, to conveniently and safely set rodent traps such as rat traps. The user holds a rodent trap gun (trap-setting device) in one hand, and uses his/her other hand to slide the rodent trap onto a base of the rodent trap gun. The hand holding the rodent trap gun is used to engage an actuator to clamp the rodent trap in place, while the other hand pulls the kill bar and secures the kill bar with the safety catch in one user motion. A trigger and/or cock mechanism allows conveniently securing the trap and releasing it when desired, before a user scoops the set trap gently onto a floor or other target surface. The similarity to handgun operation facilitates the convenient and intuitive operation of the devices. One or more adapters as described above allow convenient reuse of the same trap-setting device for different rodent trap sizes, whether different manufacturer designs for the same target rodent (e.g. rat traps made by different manufacturers) or traps designed for different rodents (e.g. rat and mouse traps). The speed, ease of use and safety of the described embodiments also make the trap setting devices useful for pest control professionals, who may set large numbers of traps and/or work in inconvenient locations such as attics.

The pulling arm configurations of FIGS. 5-A-E allows reducing the force applied by a user in order to rotate the kill bar toward its set/armed position, and conveniently combines the structures that set and secure the kill bar, preventing the kill bar from snapping before the trap is ready to be placed. At the same time, the exemplary pulling arm configuration involves a bulkier/longer mechanism than other illustrated embodiments.

A skilled artisan will appreciate that the above exemplary embodiments may be modified in a number of ways. For example, in some embodiments, a separate pull clamp may be used to pull the kill bar in the armed position so that a user does not touch the kill with his/her hands in the process. In some embodiments, the safety catch and clamping arm need not move jointly. For example, a safety catch may be mounted directly on the base, for example on a vertical pivot allowing the safety catch to pivot within a horizontal plane, and may move independently of the clamping arm. Such a safety catch may be particularly useful in conjunction with a pull clamp. A backstop need not be part of the clamping arm assembly as described above, but may be provided separately and made adjustable longitudinally, to accommodate different rodent trap lengths (longitudinal sizes). For example, for a rodent trap having a longer distance between the kill bar (in its armed position) and the rear of the trap platform, the backstop may be adjusted backward to allow the safety catch to align with the kill bar. In some embodiments, various other rotatable joints may be used in lieu of the illustrated pivots, and various other actuator designs may be used to mediate and/or control the application of force by a user's hand or motor.

In some embodiments, the safety catch may be adjustable longitudinally, for example by mounting on a slidable longitudinal arm, in order to adjust the alignment of the safety catch with the kill bar for different trap designs. Such a longitudinal adjustment of the safety catch may allow the use of a fixed backstop. A lateral guide position adjustment mechanism (e.g. channels defined along the base at different locations) may also be provided in order to accommodate different rodent trap widths (transverse sizes). In some embodiments, the handle may be fixedly attached to the base. In some embodiments, the handle may be attached through a horizontal pivot that allows adjusting the handle angle up/down, in a vertical plane, as shown for example in FIG. 16. In some embodiments, a trap setting device may be provided with more than one handle, for example one fixed handle and one adjustable handle. The adjustable handle may extend above the base, and may include a pull clamp positioned to grab the kill bar and pull it to the armed position, where the pull clamp is snapped to a locked position in order to secure the kill bar until the trap is set. Such a pull clamp can act as a safety catch, and/or may have a separate safety catch attached to the pull clamp or mounted directly on the base. A clamping arm may be attached as described above, or may mounted on such a pull clamp, for clamping the rodent trap platform to the device base.

While the description above focuses on manually-actuated embodiments, a skilled artisan will appreciate that a motor such as an electromagnetic motor may be used to power the clamping arm and/or associated safety catch. In such an embodiment, the described actuator may include a button or switch rather than a lever. The motor is coupled to the clamping arm and safety catch, and responsive to the actuator. In response to a user's pressing the actuator, the motor drives the motion of the clamping arm and safety catch upward/downward to clamp down and release the rodent trap as described above. The motor may be powered by a battery, to facilitate device portability.

A skilled artisan will further appreciate that features/structures described with reference to certain exemplary embodiments may be used in conjunction with features/structures with reference to other embodiments. For example, a mouse trap adapter, safety catch, scoop-style or gun-style handle, elongated handle, linking arm assembly, trap retainer (e.g. clamping arm, arcuate spring-loaded member, magnet), actuator, arming tool, or other components as described with reference to particular embodiments may be used in conjunction with structures described with reference to any of the other illustrated embodiments. Accordingly, the scope of the invention should be determined by the following claims and their legal equivalents.

What is claimed is:

1. A hand-held rodent trap-setting device including:
a base for supporting a platform of a rodent trap;
a handle coupled to the base, for allowing a user to hold the trap-setting device;

a clamping arm coupled to the base and configured to press down on a top surface of the rodent trap platform to secure the rodent trap to the base, for facilitating an arming of the rodent trap while the rodent trap is secured to the base, wherein the clamping arm comprises a vertical arm terminating in a rubber tip configured to contact and press down on a rear part of the platform of the rodent trap; and
a safety catch mounted on or along the clamping arm such that the safety catch and clamping arm move jointly in response to a user operating an actuator coupled to the clamping arm and safety catch, the safety catch positioned to catch a kill bar of the rodent trap when the rodent trap is mounted on the base and the kill bar is in an armed position, thereby preventing the kill bar from snapping on a user's hand while the user sets the rodent trap;
wherein the clamping arm and safety catch are positioned off-center relative to a central longitudinal axis of the base, to facilitate securing the kill bar using an arm bar of the rodent trap while the safety catch engages the kill bar.

2. The hand-held rodent trap setting device of claim 1, further comprising a release coupled to the of base, for disengaging the rodent trap from the trap-setting device to permit sliding of the rodent trap off the base at a deployment location.

3. The hand-held rodent trap setting device of claim 1, wherein the safety catch is spring-loaded.

4. The hand-held rodent trap setting device of claim 1, wherein the actuator extends rearwardly relative to the clamping arm.

5. The hand-held rodent trap setting device of claim 1, wherein the clamping arm and safety catch are positioned to the right of center when looking forward from a rear to a front of hand-held rodent trap setting device.

6. A method of setting a rodent trap, comprising:
providing a hand-held rodent trap-setting device including:
a base for supporting a platform of a rodent trap;
a handle coupled to the base, for allowing a user to hold the trap-setting device;
a clamping arm coupled to the base and configured to press down on a top surface of the rodent trap platform to secure the rodent trap to the base, for facilitating an arming of the rodent trap while the rodent trap is secured to the base, wherein the clamping arm comprises a vertical arm terminating in a rubber tip configured to contact and press down on a rear part of the platform of the rodent trap; and
a safety catch mounted on or along the clamping arm such that the safety catch and clamping arm move jointly in response to a user operating an actuator coupled to the clamping arm and safety catch, the safety catch positioned to catch a kill bar of the rodent trap when the rodent trap is mounted on the base and the kill bar is in an armed position, thereby preventing the kill bar from snapping on a user's hand while the user sets the rodent trap;
wherein the clamping arm and safety catch are positioned off-center relative to a central longitudinal axis of the base, to facilitate securing the kill bar using an arm bar of the rodent trap while the safety catch engages the kill bar;
holding the handle of the hand-held rodent trap-setting device in a first hand;

releasably securing the rodent trap to the base by sliding the rodent trap platform of the rodent trap onto the base, and employing the clamping arm coupled to the base to press down on the top surface of the rodent trap platform to secure the rodent trap to the base;

arming the rodent trap while the rodent trap is secured to the base;

employing the safety catch to catch the kill bar of the rodent trap when the rodent trap is mounted on the base and the kill bar is in the armed position; and releasing the rodent trap from the base for deployment at a deployment location.

7. The method of claim 6, further comprising employing a release coupled to the or base to disengage the rodent trap from the trap-setting device, to permit sliding of the rodent trap off the base at the deployment location.

8. The method of claim 6, wherein the safety catch is spring-loaded.

9. The method of claim 6, wherein the actuator extends rearwardly relative to the clamping arm.

10. The method of claim 6, wherein the clamping arm and safety catch are positioned to the right of center when looking forward from a rear to a front of the hand-held rodent trap setting device.

* * * * *